United States Patent
Chandrasekaran et al.

(10) Patent No.: US 12,021,963 B2
(45) Date of Patent: Jun. 25, 2024

(54) METHODS AND SYSTEMS FOR DISTRIBUTED HIGH SPEED STATE SYNCHRONIZATION

(71) Applicant: Pensando Systems Inc., Milpitas, CA (US)

(72) Inventors: Varagur Chandrasekaran, Fremont, CA (US); Akshaya Nadahalli, Bangalore (IN); Balakrishnan Raman, Fremont, CA (US); Chandrasekaran Swaminathan, Bangalore (IN); John Cruz, San Jose, CA (US); Maruthi Ram Namburu, Bangalore (IN); Pirabhu Raman, Fremont, CA (US); Vijay Sampath, Milpitas, CA (US); Vipin Jain, San Jose, CA (US)

(73) Assignee: Pensando Systems Inc., Milpitas, CA (US)

( * ) Notice: Subject to any disclaimer, the term of this patent is extended or adjusted under 35 U.S.C. 154(b) by 296 days.

(21) Appl. No.: 17/411,988

(22) Filed: Aug. 25, 2021

(65) Prior Publication Data
US 2023/0069844 A1 Mar. 9, 2023

(51) Int. Cl.
*H04L 7/033* (2006.01)
*G06F 16/22* (2019.01)
(Continued)

(52) U.S. Cl.
CPC .............. *H04L 7/033* (2013.01); *G06F 16/22* (2019.01); *G06F 16/27* (2019.01); *H04L 67/1095* (2013.01)

(58) Field of Classification Search
CPC . H04L 7/033; H04L 67/1095; H04L 63/0254; H04L 63/1458; H04L 45/24; H04L 43/0817
See application file for complete search history.

(56) References Cited

U.S. PATENT DOCUMENTS

2002/0124187 A1 9/2002 Lyle et al.
2008/0077686 A1 3/2008 Subhraveti
(Continued)

OTHER PUBLICATIONS

Van Renesse, Robbert et al. "Chain Replication for Supporting High Throughput and Availability", OSDI'04: Proceedings of the 6th conference on Symposium on Operating Systems Design & Implementation—vol. 6, Dec. 2004, 14 pgs.
(Continued)

*Primary Examiner* — Iqbal Zaidi
(74) *Attorney, Agent, or Firm* — LOZA & LOZA, LLP

(57) ABSTRACT

Synchronizing the databases maintained by network appliances can support high availability or high throughput topologies, but also consumes the devices' processing resources. To address that resource consumption, the network appliance's packet processing pipeline circuits can process synchronization packets to thereby synchronize the databases. A local data structure can be in a first local state. Processing a network packet can result in changing the local data structure to a second local state. A state sync packet can include state transition data that indicates a state difference between the first local state and the second local state. The state sync packet can be sent to a peer device that is configured to process the state transition data using the peer device's packet processing pipeline circuit. The peer device's packet processing pipeline can use the state transition data to update a peer device data structure that is in the peer device.

19 Claims, 16 Drawing Sheets

(51) Int. Cl.
G06F 16/27 (2019.01)
H04L 67/1095 (2022.01)

(56) References Cited

U.S. PATENT DOCUMENTS

| | | |
|---|---|---|
| 2013/0013619 A1 | 1/2013 | Lacapra et al. |
| 2015/0142988 A1 | 5/2015 | Wen |
| 2016/0105471 A1 | 4/2016 | Nunes et al. |
| 2016/0335074 A1* | 11/2016 | Olivier ................ H04L 67/1095 |
| 2021/0167902 A1* | 6/2021 | Ashizuka ............... H04L 1/0045 |
| 2022/0377409 A1* | 11/2022 | Marchuk ............... G06F 16/433 |

OTHER PUBLICATIONS

Terrace, Jeff et al. "Object Storage on CRAQ: High-throughput chain replication for read-mostly workloads", Jan. 2009, 16 pgs.
P4.ORG, "P416 Language Specification", version 1.2.2, May 17, 2021, 170 pgs.
P4.ORG, "P4 Language Tutorial", 2017, 55 pgs.
Sivaraman, Anirudh et al. "DC.p4: Programming the Forwarding Plane of a Data-Center Switch", 2015, 8 pgs.
PCT/US2022/041100. International Search Report & Written Opinion (dated Nov. 16, 2022).

* cited by examiner

METHODS AND SYSTEMS FOR DISTRIBUTED HIGH SPEED STATE SYNCHRONIZATION

TECHNICAL FIELD

The embodiments relate to computer networks, local area networks, network appliances such as routers, switches, network interface cards (NICs), smart NICs, and distributed service cards (DSCs). The embodiments also relate to packet processing pipelines, network packet processing queues, and high availability network hardware.

BACKGROUND

Network appliances process network traffic flows by receiving network packets and processing network packets. The network packets are often processed by examining the packet's header data and applying rules such as routing rules, firewall rules, load balancing rules, etc. Packet processing can be performed by a packet processing pipeline such as a "P4" packet processing pipeline. The concept of a domain-specific language for programming protocol-independent packet processors, known simply as "P4," developed as a way to provide some flexibility at the data plane of a network appliance. The P4 domain-specific language for programming the data plane of network appliances is currently defined in the "$P4_{16}$ Language Specification," version 1.2.2, as published by the P4 Language Consortium on May 17, 2021, which is incorporated by reference herein. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

Network appliances may be arranged for high availability or high speed processing wherein more than one network appliance is configured to process a particular network traffic flow.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a method. The method can include storing a local data structure that is in a first local state, receiving a network packet, updating the local data structure to a second local state by using a CPU core to process the network packet, producing a state sync packet that includes state transition data, and sending the state sync packet to a peer device that is configured to process the state transition data using a peer device packet processing pipeline, wherein the peer device packet processing pipeline uses the state transition data to update a peer device data structure that is in the peer device, and the state transition data indicates a state difference between the first local state and the second local state.

Another aspect of the subject matter described in this disclosure can be implemented by a network appliance. The network appliance can include a memory configured to store a local data structure that is in a first local state, a CPU core configured to update the local data structure to a second local state by processing a network packet received by the network appliance, and a packet processing pipeline that includes a parser and at least one match action unit, wherein the network appliance is configured to produce a state sync packet that includes state transition data that indicates a state difference between the first local state and the second local state, send the state sync packet to a peer device, and use the packet processing pipeline to update the local data structure by processing a peer state sync packet received from the peer device.

Yet another aspect of the subject matter described in this disclosure can be implemented by a system comprising a means for storing a data structure that includes local dirty records, local clean records, and peer records, a means for using a CPU core to create the local dirty records, a means for using a packet processing circuitry to process a plurality of peer state sync packets, a means for using the packet processing circuitry to create and update the peer records based on the peer state sync packets, and a means for using the packet processing circuitry to create state sync packets.

In some implementations of the methods and devices, a plurality of state sync packets is used to synchronize the local data structure and the peer device data structure. In some implementations of the methods and devices, the method can include receiving a peer state sync packet that includes a peer state transition data, and processing the peer state transition data using a local packet processing pipeline, wherein the local packet processing pipeline uses the peer state transition data to update the local data structure to a third local state. In some implementations of the methods and devices, the local packet processing pipeline includes a parser stage and a plurality of match-action units. In some implementations of the methods and devices, the local packet processing pipeline uses the peer state transition data to create a peer record in the local data structure, and updates to the peer record are restricted to peer updates from the peer device.

In some implementations of the methods and devices, updating the local data structure to the second local state creates a new record that is marked local and dirty, the local data structure includes a plurality of local dirty records that includes the new record, a local packet processing pipeline is configured to use the local dirty records to produce the state sync packet, and the local packet processing pipeline is configured to mark the local dirty records as local clean records. In some implementations of the methods and devices, the peer device is configured to not acknowledge the state sync packet unless an explicit acknowledgement is requested, and to send an explicit sync request after detecting a missing state sync packet.

In some implementations of the methods and devices, the method can include assembling a second state sync packet in response to receiving an explicit sync request from the peer device, and sending the second state sync packet to the peer device. In some implementations of the methods and devices, the peer device packet processing pipeline includes a parser stage and a plurality of match-action units. In some implementations of the methods and devices, updating the local data structure to the second local state creates a local record, and updates to the local record by the peer device are disallowed. In some implementations of the methods and devices, the peer device is a downstream node in a replication chain. In some implementations of the methods and devices, the method can include sending a full state sync packet to the peer device in response to receiving a full state sync request, wherein the peer device is configured to use the peer device packet processing pipeline for full state population of the peer device data structure by processing the full state sync packet.

In some implementations of the methods and devices, updating the local data structure by processing the peer state sync packet creates a peer record in the local data structure, and updates to the peer record are restricted to peer updates from the peer device. In some implementations of the methods and devices, updating the local data structure to the second local state creates a new record that is marked local and dirty, the local data structure includes a plurality of local dirty records that includes the new record, the packet processing pipeline is configured to use the local dirty records to produce the state sync packet, and the packet processing pipeline is configured to mark the local dirty records as local clean records. In some implementations of the methods and devices, the network appliance is configured to not acknowledge the peer state sync packet unless an explicit acknowledgement is requested, and to send an explicit sync request after detecting a missing peer state sync packet. In some implementations of the methods and devices, the network appliance is configured to assemble a second state sync packet in response to receiving an explicit sync request from the peer device, and send the second state sync packet to the peer device. In some implementations of the methods and devices, the peer device is a downstream node of the network appliance in a replication chain.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
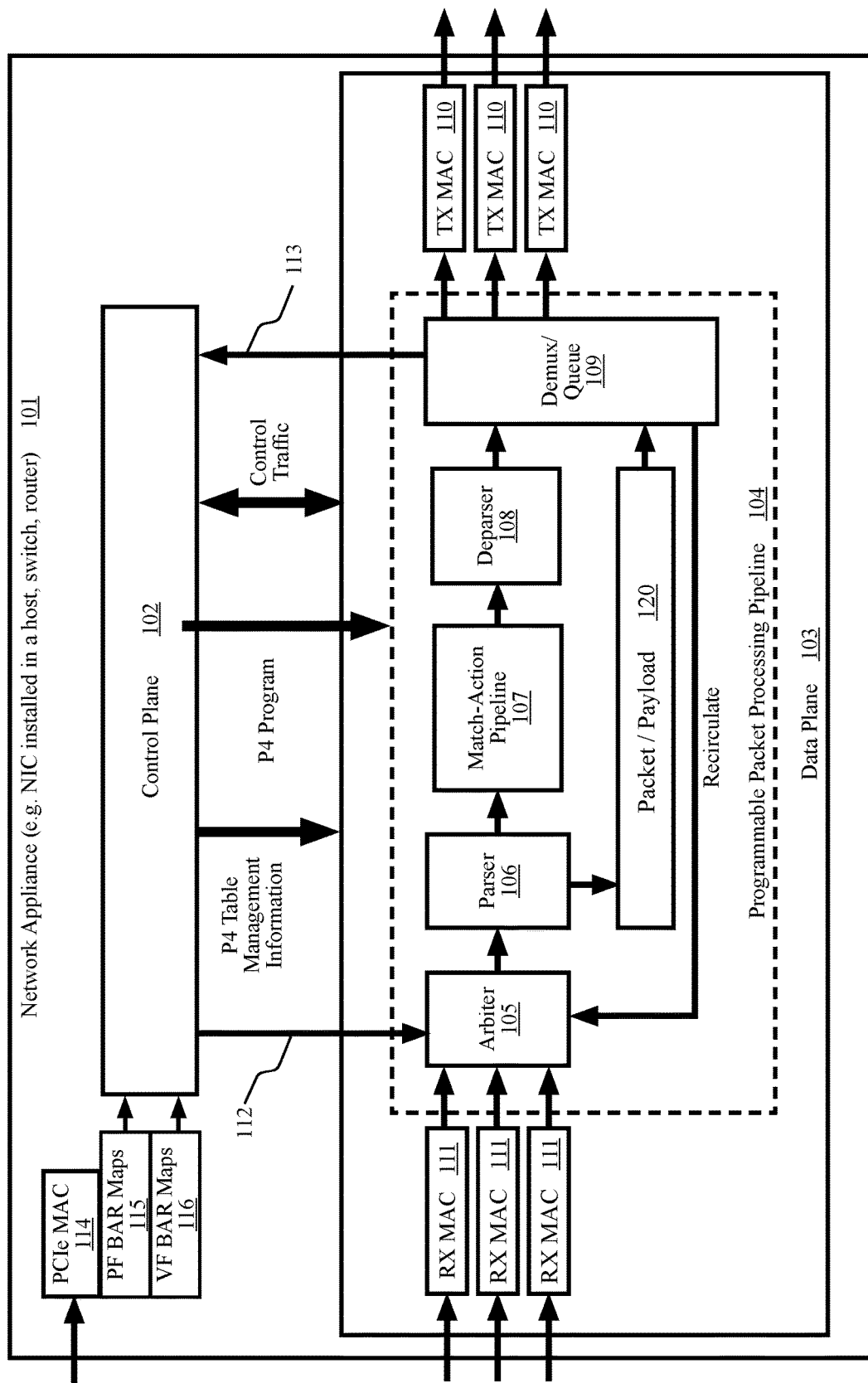
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Networks are often designed with redundancy in order to provide fault tolerance, resilience, fail over, and high throughput. Redundancy can be provided by two or more network appliances that synchronize configuration and status data for network flows and sessions. Synchronizing such data can be costly because synchronization processes consume network bandwidth and consume the processing resources of the network appliances, such as the CPU cores. The CPU cores can receive synchronization data and use the synchronization data to update internal databases. As such, synchronization can be constrained by the availability of CPU cores and by the other tasks that CPU cores must perform.

Many network appliances include special purpose hardware for offloading certain processing from the CPU cores. For example, many network appliances have control planes and data planes. The CPU cores can provide processing resources for the control plane. The data plane can include a packet processing pipeline circuit, such as a P4 packet processing pipeline. The data plane can offload network packet processing from the CPU cores, thereby freeing up control plane resources. Furthermore, packet processing pipelines have proven capable of processing network traffic at extreme speeds. It has been found that the packet processing pipeline can also process synchronization packets, thereby providing extremely fast synchronization capabilities to network appliances.

The packet processing pipeline can include a parser circuit and numerous match-action units. The parser circuit is specifically designed for locating data values in network packet header fields and for placing those data fields in a packet header vector (PHV). The match-action units are specifically designed for using the values in the packet header vector to produce a key that may match an index in a table of actions. If there is an entry in the table that matches the PHV, the match-action units can implement the actions associated with the key.

The speed of packet processing pipelines can be leveraged for synchronization when the synchronization packets are specifically formatted for processing by the packet processing pipeline. In particular, the sync packets can be formatted such that the parser circuit can provide synchronization data to the match-action units. The match-action units can then update data structures that are stored in memory. For example, the sync packets can include synchronization data as tag-length-value (TLV) fields that the parser circuit can parse. The packet processing pipeline can copy the values from the TLV fields into the records that are stored in the data structure.

One advantage of using packet processing pipelines to synchronize data structures is that the synchronization processing is offloaded from the CPU cores to specialized circuits that can perform the synchronization processing more efficiently and more quickly. In addition, the CPU cores are freed to perform other tasks. As such, the network appliance as a whole operates more efficiently. Another advantage is that more comprehensive synchronization is made possible. Entire flow tables, session tables, and other data structures can be kept in synchronization instead of select data structures or portions of data structures (e.g., all flows instead of only high priority flows). These advances in synchronization may underpin advances in providing redundant network services such as those provided by network devices arranged in replication chains.

In the field of data networking, the functionality of network appliances such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing.

FIG. 1 is a functional block diagram of a network appliance having a control plane and a data plane and in which aspects may be implemented. A network appliance 101 can have a control plane 102 and a data plane 103. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is defined in the "$P4_{16}$ Language Specification," version 1.2.2, as published by the P4 Language Consortium on May 17, 2021, which is incorporated by reference herein. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MACs 111 implement media access control on incoming packets via, for example, a MAC protocol such as Ethernet. The MAC protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 110 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 1, a P4 program is provided to the data plane 103 via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, as a P4 programmable router, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector or "PHV." The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, InfiniBand PDUs, etc.) as determined by the match-action pipeline. In some cases, a packet/payload may travel in a separate queue or buffer 120, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 105 for additional processing.

A network appliance 101 can have a peripheral component interconnect extended (PCIe) interface such as PCIe media access control (MAC) 114. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-IOV) capable. Such PCIe devices can have a physical function (PF) and multiple virtual functions (VFs). A PF BAR map 115 can be used by the host machine to communicate with the PCIe card. A VF BAR map 116 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC' VFs and "InfiniBand" VFs to VMs running on the host. The InfiniBand PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

Figure 2:
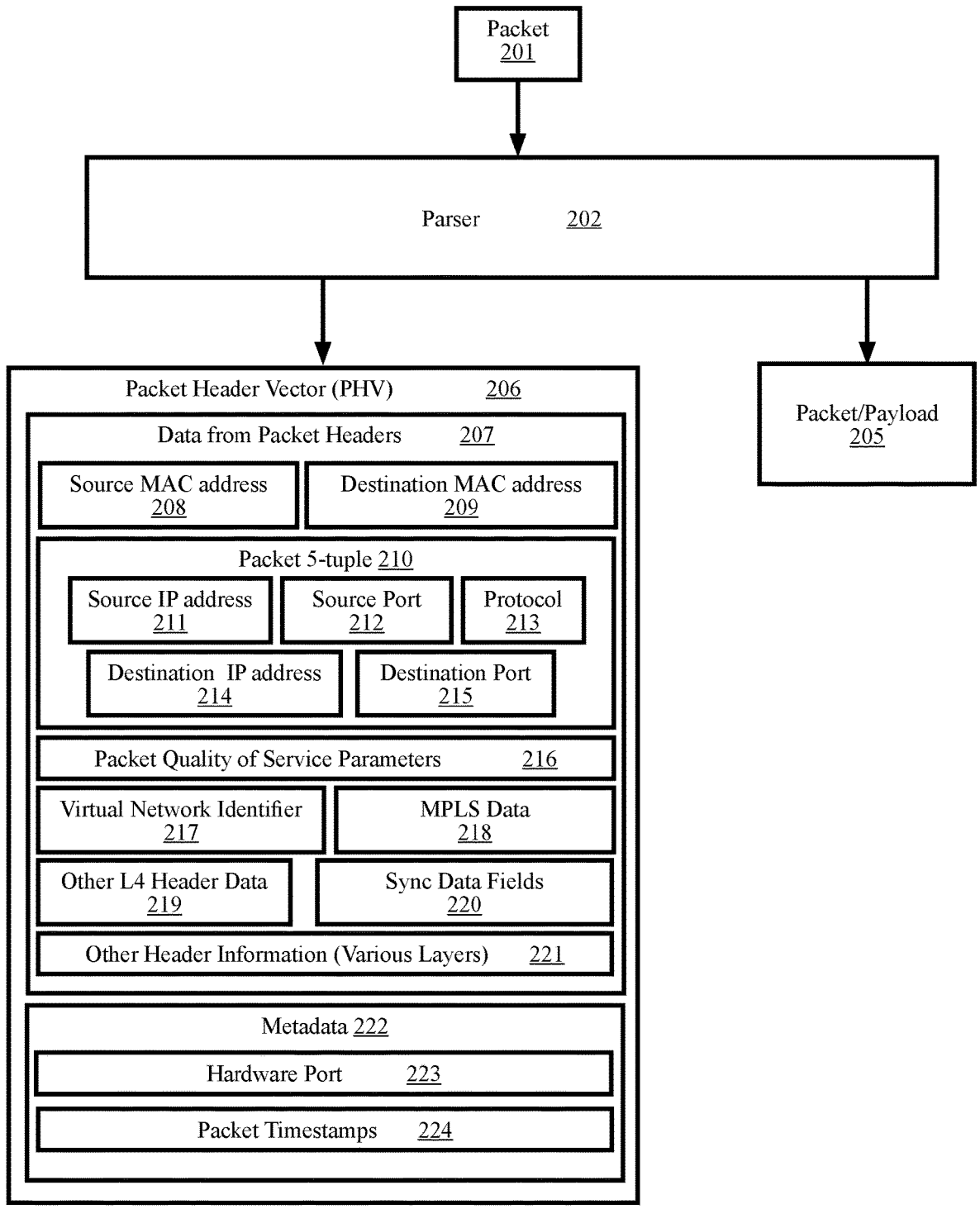
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamps 224 indicating when the packet 201 was received by the network appliance, enqueued, dequeued, etc.

The source MAC address 208 and the destination MAC address 209 can be obtained from the packet's layer 2 header. The source IP address 211 can be obtained from the packet's layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packet's layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. State synchronization data, such as sync data fields 220, can be obtained from record transition data that may be in the layer 7 packet in the layer 4 payload. The other header information 221 is the other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Figure 3:
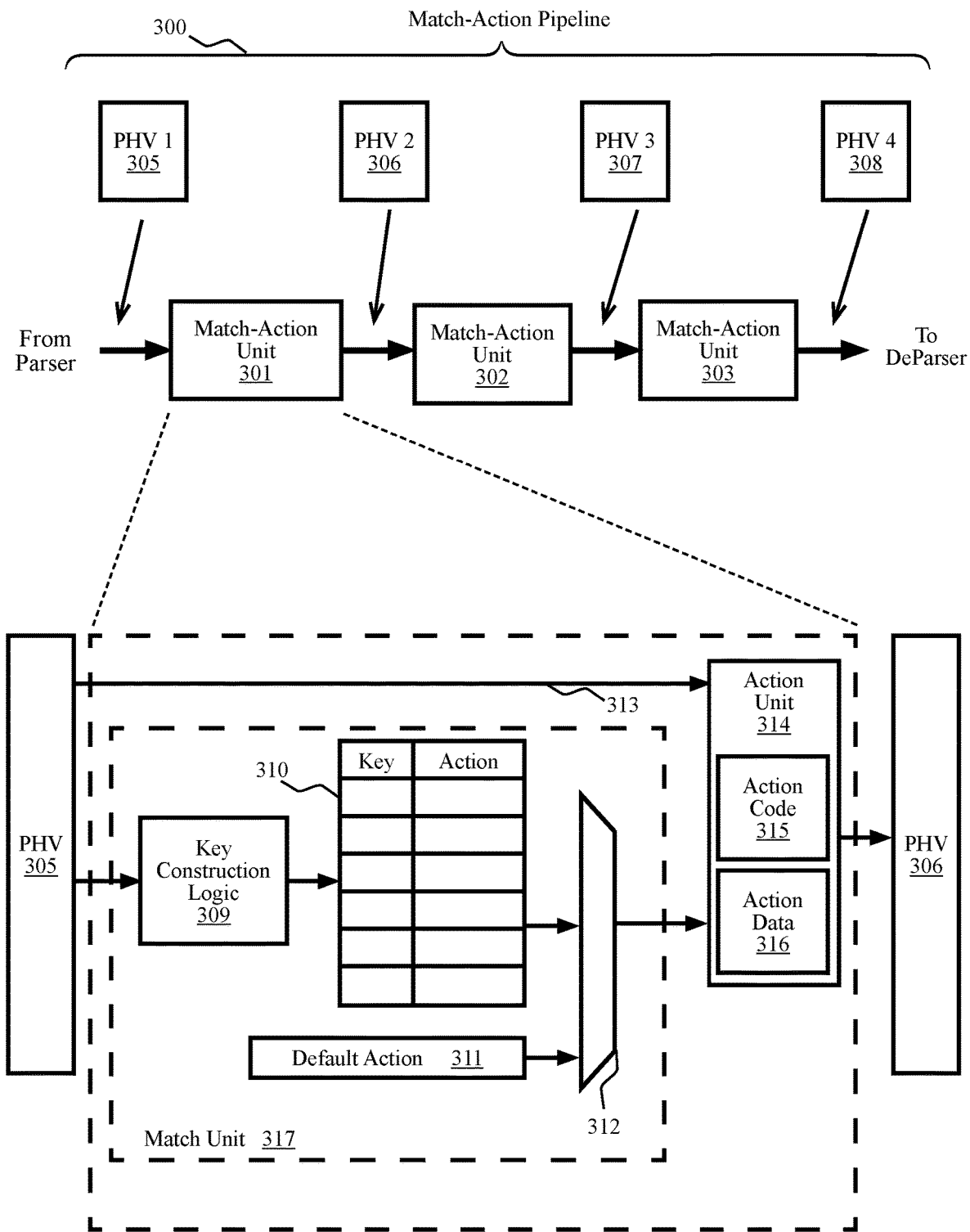
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action unit can be programmable by the control plane via P4 and the contents of the lookup table can be managed by the control plane.

Figure 4:
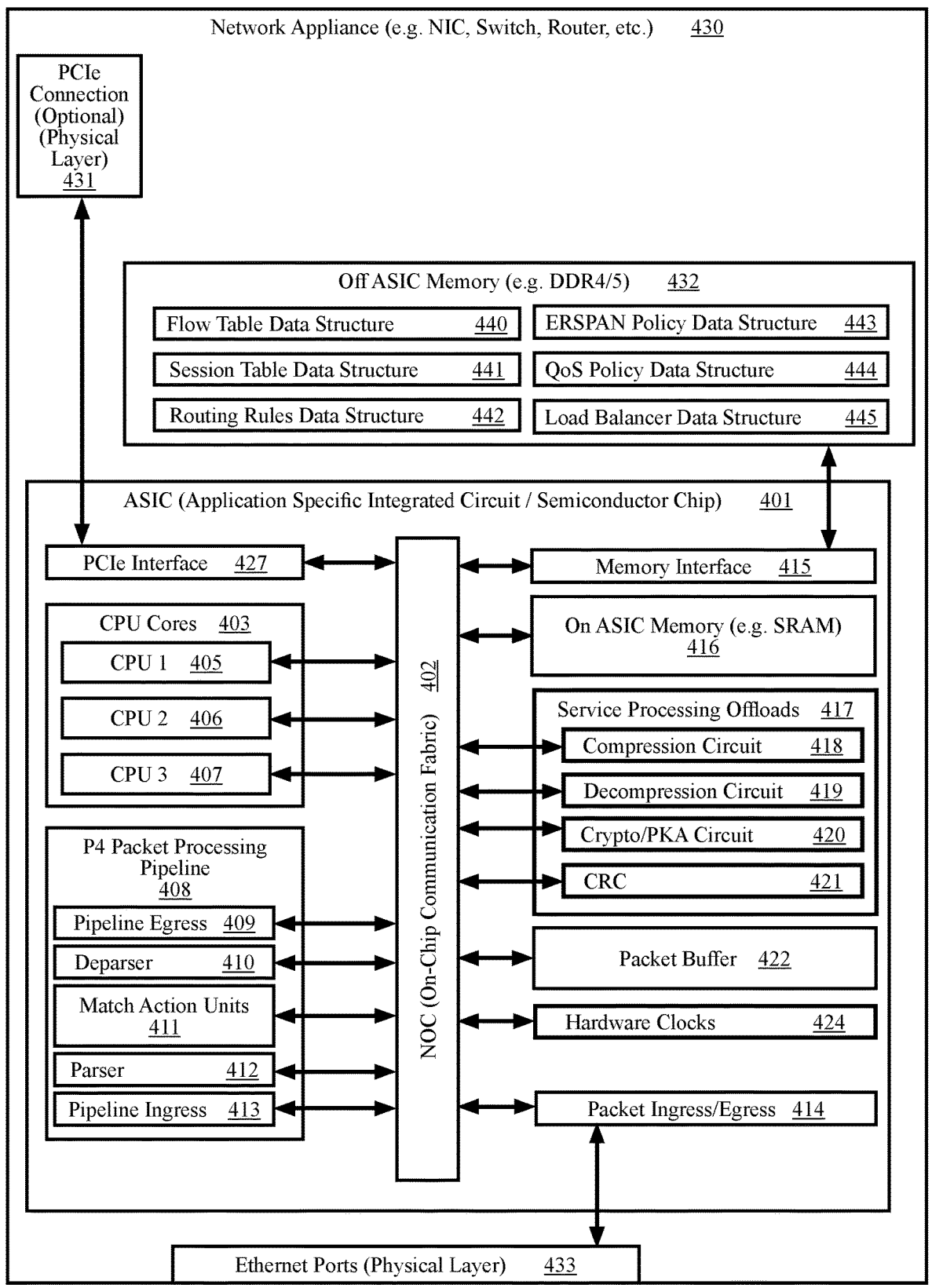
FIG. 4 is a functional block diagram of a network appliance having an ASIC (application specific integrated circuit), according to some aspects.

FIG. 4 is a functional block diagram of a network appliance 430 having an application specific integrated circuit (ASIC) 401, according to some aspects. If the network appliance is a network interface card (NIC) then the NIC can be installed in a host computer and can act as a network appliance for the host computer and for virtual machines running on the host computer. Such a NIC can have a PCIe connection 431 for communicating with the host computer. The network appliance 430 can have an ASIC 401, off-ASIC memory 432, and ethernet ports 433. The off-ASIC memory 432 can be one of the widely available memory modules or chips such as double data rate 4 (DDR4) synchronous dynamic random-access memory (SDRAM) such that the ASIC has access to many gigabytes of memory on the network appliance 430. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used AXI bus. The ASIC's core circuits can include a PCIe interface 427, CPU cores 403, P4 packet processing pipeline 408 elements, memory interface 415, on ASIC memory (e.g., SRAM) 416, service processing offloads 417, a packet buffer 422, extended packet processing pipeline 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an InfiniBand channel adapter, of an NVMe card, and of a network appliance that processes network traffic flows carried by IP (internet protocol) packets.

A network device can include precision clocks that output a precise time, clocks that are synchronized to remote authoritative clocks via PTP, and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks can be used as timestamps for events such as enqueuing/dequeuing a packet.

The P4 packet processing pipeline 408 is a specialized set of elements for processing network packets such as IP (internet protocol) packets and InfiniBand PDUs (protocol data units). The P4 pipeline can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system and for storing data used by the processes implementing network services. A network appliance that implements distributed high speed state synchronization can store a flow table data structure 440, a session table data structure 441, a routing table data structure 442, an encapsulated remote switched port analyzer (ERSPAN) policy data structure 443, a QoS policy data structure 444, and a load balancer data structure 445. The data structures can be implemented using trees, linked lists, hash tables, and other data structures known in the art.

The CPU cores 403 can be general purpose processor cores, such as ARM processor cores, MIPS processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408.

The packet processing pipeline circuit 408 can be a specialized circuit or part of a specialized circuit using one or more ASICs or FPGAs to implement programmable packet processing pipelines such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

All memory transactions in the network appliance 430, including host memory transactions, on board memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
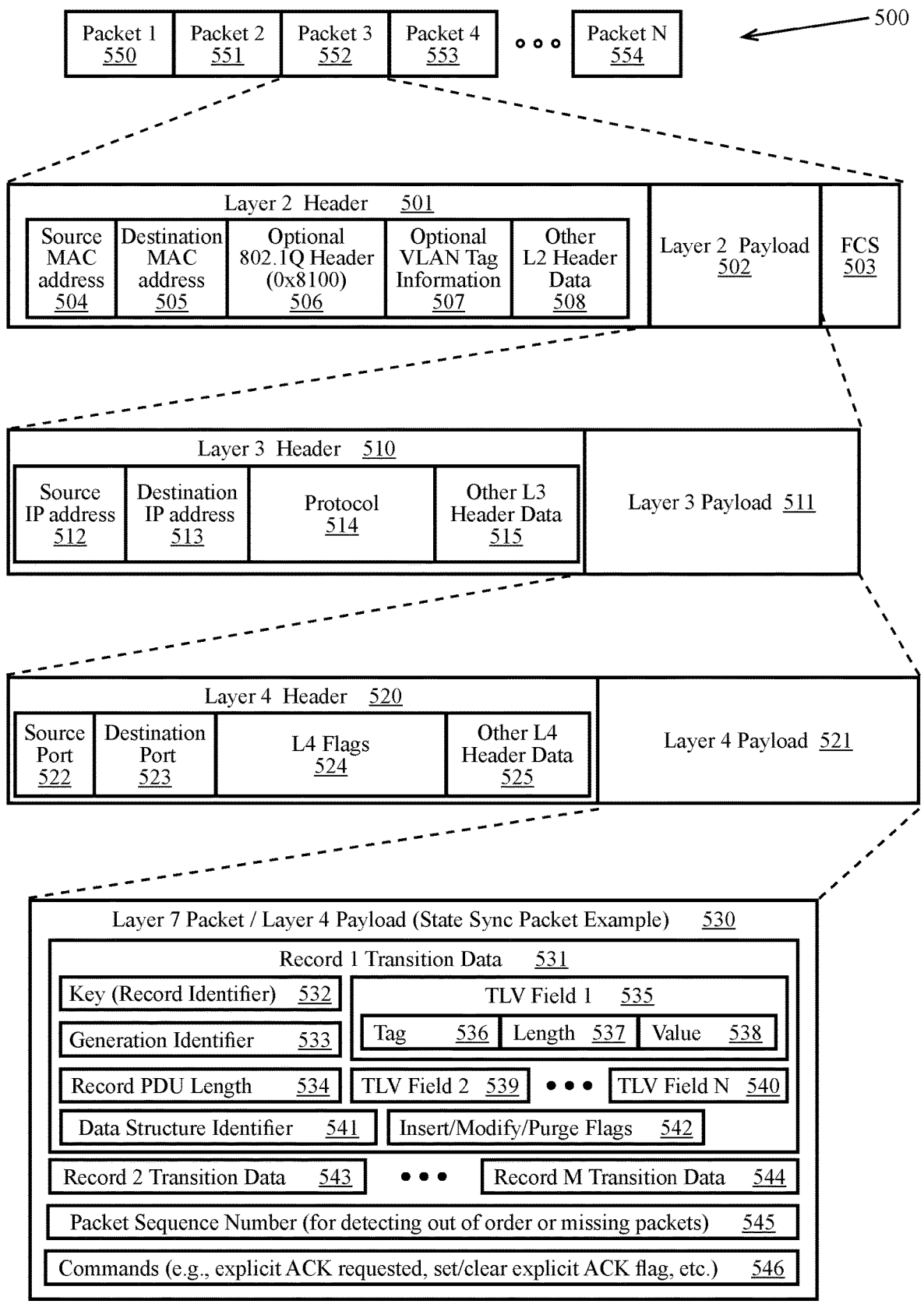
FIG. 5 illustrates packet headers and payloads of packets for network traffic flows including layer 7 fields according to some aspects.

FIG. 5 illustrates packet headers and payloads of packets for network flows 500 including layer 7 fields according to some aspects. A network flow 500 can have numerous network packets such as a first packet 550, a second packet 551, a third packet 552, a fourth packet 553, and a final packet 554 with many more packets between the fourth packet 553 and the final packet 554. The term "the packet" or "a packet" may refer to any of the packets in a network flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 501, a layer 2 payload 502, and a layer 2 frame check sequence (FCS) 503. The layer 2 header can contain a source MAC address 504, a destination MAC address 505, an optional 802.1Q header 506, optional VLAN tag information 507, and other layer 2 header data 508. The input ports 111 and output ports 110 of a network appliance 101 can have MAC addresses. A network appliance 101 can have a MAC address that is applied to all or some of the ports. Alternatively, a network appliance may have one or more ports that each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3, is a layer 2 protocol. IEEE 802.11 (WiFi) is another widely used layer 2 protocol. The layer 2 payload 502 can include a layer 3 packet. The layer 2 FCS 503 can include a CRC (cyclic redundancy check) calculated from the layer 2 header and layer 2 payload. The layer 2 FCS can be used to verify that the packet has been received without errors.

IEEE 802.1Q is the networking standard that supports VLANs on IEEE 802.3 networks. The optional 802.1Q header 506 and VLAN tag information 507 are specified by the IEEE 802.1Q standard. The 802.1Q header is the two-octet value 0x8100 that indicates that VLAN tag information 507 is present. The VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 510 and a layer 3 payload 511. The layer 3 header 510 can have a source IP address 512, a destination IP address 513, a protocol indicator 514, and other layer 3 header data 515. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 511 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 510 using protocol indicator 514. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 511 includes a TCP header and a TCP payload. UDP can provide for computer applications to send messages, in this case referred to as datagrams, to other hosts on an IP network using a connectionless model. When carrying UDP data, a layer 3 payload 511 includes a UDP header and a UDP payload. ICMP is used by network devices, including routers, to send error messages and operational information indicating success or failure when communicating with another IP address. ICMP uses a connectionless model.

A layer 4 packet can have a layer 4 header 520 and a layer 4 payload 521. The layer 4 header 520 can include a source port 522, destination port 523, layer 4 flags 524, and other layer 4 header data 525. The source port and the destination port can be integer values used by host computers to deliver packets to application programs configured to listen to and send on those ports. The layer 4 flags 524 can indicate a status of or action for a network traffic flow. A layer 4 payload 521 can contain a layer 7 packet.

The application layer, often called layer 7, includes the protocols used by most applications for providing user services or exchanging application data over the network connections established by the lower-level protocols. Examples of application layer protocols include Precision Time Protocol (PTP), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol units (such as TCP or UDP messages), which in turn use lower layer protocols to effect actual data transfer.

A layer 4 payload 521 may include a layer 7 packet such as a state sync packet 530. A state sync packet 530 can include transition data for database records, a packet sequence number 545, and commands 546. The transition data for database records can include record 1 transition data 531, record 2 transition data 543, and transition data for other records up to and including record M transition data 544 where M may be an integer greater than 2. Record transition data, such as record 1 transition data 531, can include a key 532, a generation identifier 533, a record protocol data unit (PDU) length 534, a data structure identifier 541, flags 542, and tag-length-value (TLV) fields. The data structure identifier 541 can indicate the specific database such as a flow table, session table, etc. The key 532 can be a record identifier that identifies a specific record in the database. The generation identifier 533 can indicate the version of the record used to generate the record transition data and can be used to prevent a newer record being overwritten by an older record. The record PDU length 534 can indicate the total length of the TLV fields (e.g., total number of bytes) in the record transition data. The flags can indicate the action (e.g., insert, modify, purge, etc.) to be executed. The key 532, generation identifier 533, record PDU length 534, data structure identifier 541, and flags 542 can be fixed length fields located at specific locations within the state sync packet. As such, the parser circuit can read those fields by copying specific bits in the sync packet into specific locations in a PHV, a device register, a memory, etc. The TLV fields may not be fixed length. The total length of all the TLV fields can be indicated by the record PDU length 534. The TLV fields can include a tag 536, a length 537, and a value 538. The tag 536 can be a fixed length field that indicates a specific field in the database record identified by the key 532. The length 537 can indicate the length (e.g., length in bits, length in bytes, etc.) of the value 538. The value 538 can contain data to be written into the database field indicated by the tag 536.

Figure 6:
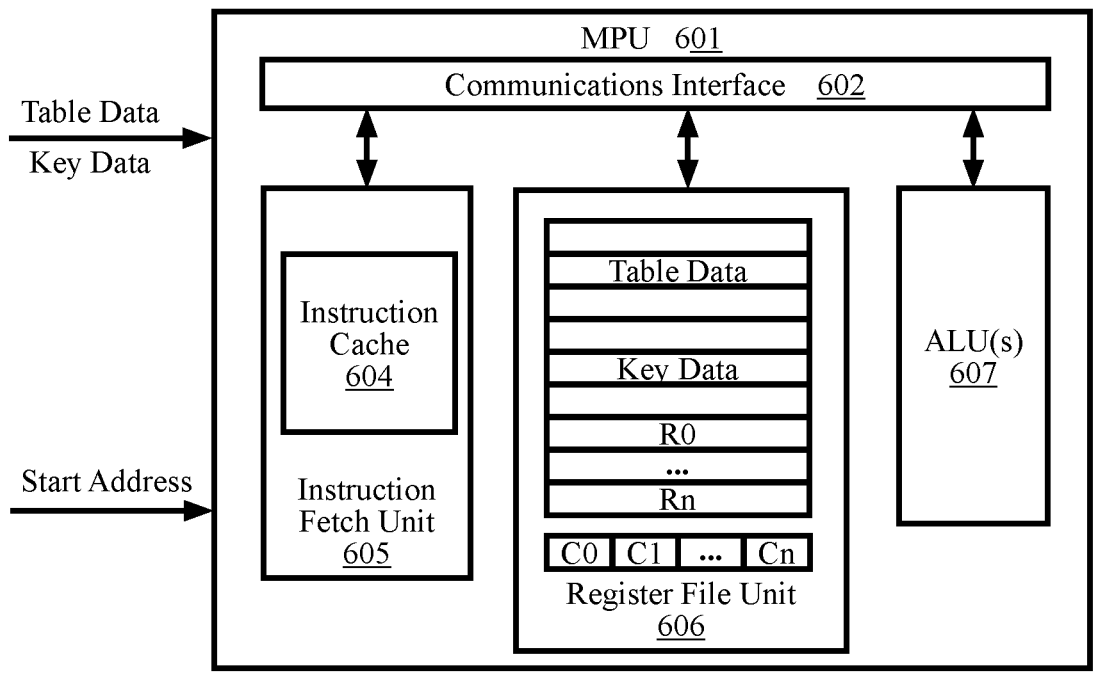
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 can have multiple functional units, memories, and a register file. For example, the MPU 601 may have an instruction fetch unit 605, a register file unit 606, a communication interface 602, arithmetic logic units (ALUs) 607 and various other functional units.

In the illustrated example, the MPU 601 can have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as advanced high-performance bus (AHB) protocol or advanced peripheral bus (APB) protocol in addition to the AXI protocol.

The MPU 601 can have an instruction fetch unit 605 configured to fetch instructions from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. Details about the table engine are described later herein. In some embodiments, the instruction fetch unit 605 can have an instruction cache 604 for storing one or more programs. In some cases, the one or more programs may be loaded into the instruction cache 604 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 602. This provides flexibility to allow for executing different programs associated with different types of data using the same processing unit. In an example, a management PHV can be injected into the pipeline, for example to perform administrative table direct memory access (DMA) operations or entry aging functions (i.e., adding timestamps), one of the management MPU programs may be loaded to the instruction cache to execute the management function. The instruction cache 604 can be implemented using various types of memories such as one or more SRAMs.

The one or more programs can be any programs such as P4 programs related to reading table data, building headers, DMA to/from memory, writing to/from memory, and various other actions. The one or more programs can be executed in any match-action unit.

The MPU 601 can have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some embodiments, each register of the register file is 64 bits and may be initially loaded with special metadata values such as hash value from table lookup, packet size, PHV timestamp, programmable table constant and the like.

In some embodiments, the register file unit 606 can have a comparator flags unit (e.g., C0, C1, . . . Cn) configured to store comparator flags. The comparator flags can be set by calculation results generated by the ALU which in return can be compared with constant values in an encoded instruction to determine a conditional branch instruction. In some embodiments, the MPU can have one-bit comparator flags (e.g., 8 one-bit comparator flags). In practice, an MPU can have any number of comparator flag units each of which may have any suitable length.

The MPU 601 can have one or more functional units such as the ALU(s) 607. An ALU may support arithmetic and logical operations on the values stored in the register file unit 606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general purpose registers from the host memory.

The MPU 601 can have other functional units such as meters, counters, action insert units, and the like. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

The MPU may be capable of locking a table. In some cases, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table address, for example, one for the previous table write-back and another address lock for the current MPU program.

In some embodiments, a single MPU may be configured to execute instructions of a program until completion of the program. In other embodiments, multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
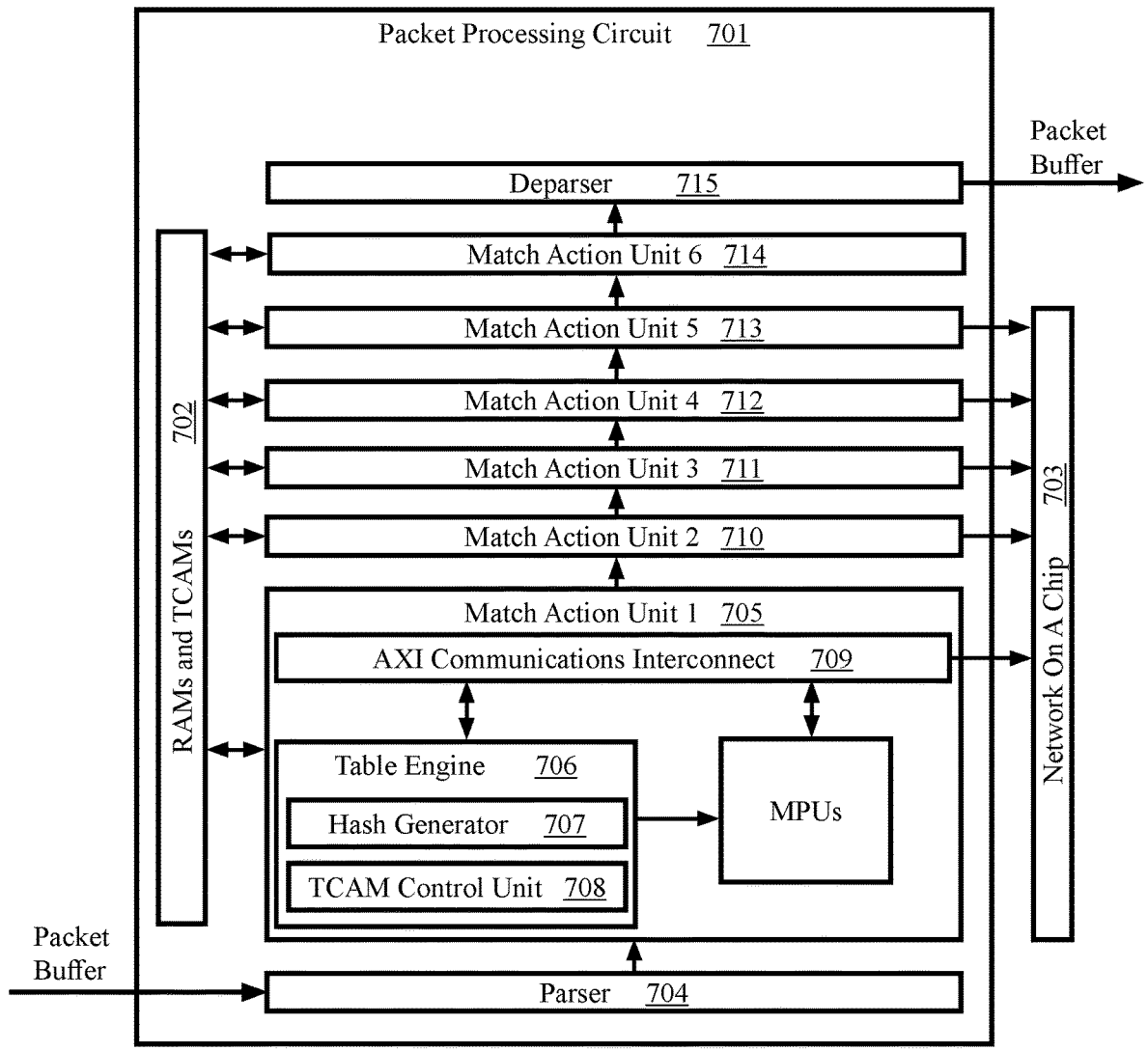
FIG. 7 illustrates a block diagram of a packet processing circuit that may be used as a P4 ingress/egress pipeline within the exemplary system of FIG. 4.

FIG. 7 illustrates a block diagram of a packet processing circuit 701 that may be configured as a P4 ingress/egress pipeline within the exemplary system of FIG. 4. A P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others.

A programmer or compiler may decompose a packet processing program into a set of dependent or independent table lookup and action processing stages (i.e., match-action) that can be mapped onto the table engine and MPU stages. The match-action pipeline can have a plurality of stages. For example, a packet entering the pipeline may be first parsed by a parser (e.g., parser 704) according to the packet header stack specified by a P4 program. This parsed representation of the packet may be referred to as a packet header vector (PHV). The PHV may then be passed through stages (e.g., stages 705, 710, 711, 712, 713, 714) of the match-action pipeline. Each pipeline stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser 715. The deparser 715 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress parsed header vector. The egress parsed header vector may be passed through a P4 egress pipeline in a similar fashion as a packet passing through a P4 ingress pipeline, after which a final deparser operation may be executed before the packet is sent to its destination interface or recirculated for additional processing. The network appliance 430 of FIG. 4 has a P4 pipeline that can be implemented via a packet processing circuit 701.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV.

The pipeline MPUs of the match-action units 705, 710, 711, 712, 713, 714 can be the same as the MPU 601 of FIG. 6. Match-action units can have any number of MPUs. The match-action units of a match-action pipeline can all be identical.

A table engine 706 may be configured to support per-stage table match. For example, the table engine 706 may be configured to hash, lookup, and/or compare keys to table entries. The table engine 706 may be configured to control the address and size of the table, use PHV fields to generate a lookup key, and find Session Ids or MPU instruction pointers that define the P4 program associated with a table entry. A table result produced by the table engine can be distributed to the multiple MPUs.

The table engine 706 can be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on packet type or protocols (e.g., Internet Protocol version 4 (IPv4), Internet Protocol version 6 (IPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

In some embodiments, the table engine 706 can have a hash generation unit 707. The hash generation unit may be configured to generate a hash result off a PHV input and the hash result may be used to conduct a DMA read from a DRAM or SRAM array. In an example, the input to the hash generation unit may be masked according to which bits in the table selection key contribute to the hash entropy. In some cases, the same mask may be used by the table engine for comparison with the returning SRAM read data. In some instances, the hash result may be scaled according to the table size, then the table base offset can be added to create a memory index. The memory index may be sent to the DRAM or SRAM array and to perform the read.

The table engine 706 can have a TCAM control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 706 may be implemented by hardware or circuitry. The table engine may be hardware defined. In some cases, the results of table lookups or table results are provided to the MPU in its register file.

A match-action pipeline can have multiple match-action units such as the six units illustrated in the example of FIG. 7. In practice, a match-action pipeline can have any number of match-action units. The match-action units can share a common set of SRAMs and TCAMs 702. The SRAMs and TCAMs 702 may be components of the pipeline. This arrangement may allow the six match-action units to divide match table resources in any suitable proportion which provides convenience to the compiler and eases the compiler's task of resource mapping. Any suitable number of SRAM resources and any suitable number of TCAM resources may be used by each pipeline. For example, the illustrated pipeline can be coupled to ten SRAM resources and four or eight TCAM resources. In some instances, TCAMs may be fused vertically or horizontally for a wider or deeper search.

Figure 8:
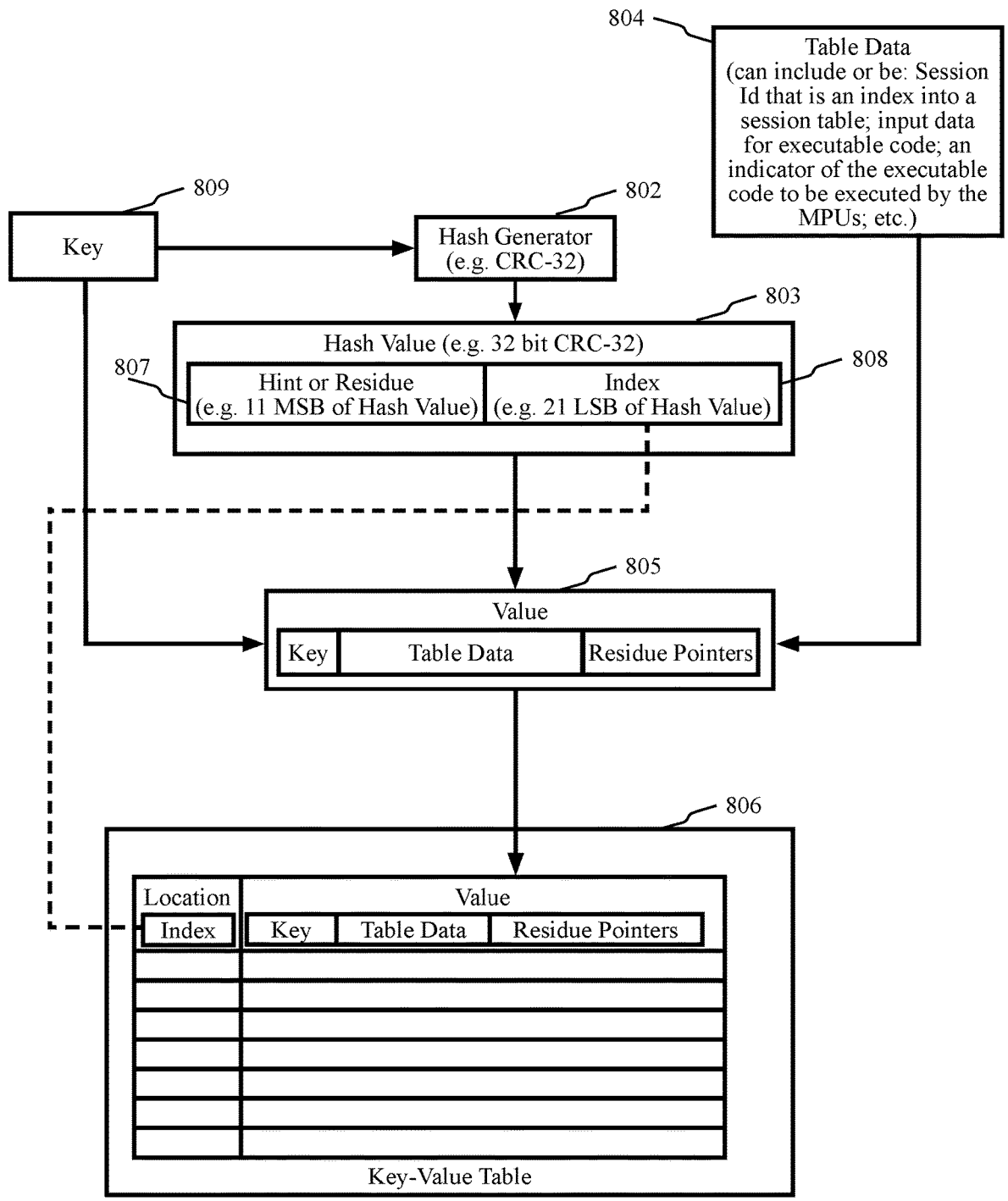
FIG. 8 illustrates populating a key-value table according to some aspects.

FIG. 8 illustrates populating a key-value table according to some aspects. In the non-limiting example of FIG. 8, a key 809 is read from a PHV. The key can be, for example, the 5-tuple of the packet or can be assembled from other data in the PHV. A hash generator 802 receives the key 809 and generates a hash value. The hash value can be a CRC-32 computed using the key or can be computed using a different hashing algorithm or different PHV fields. The hash value 803 can be divided into an index 808 and a hint or residue 807. For example, the index 808 can be the 21 least significant bits of the hash value 803 while the residue 807 can be the remaining 11 bits. The index can provide the location of a value 805 in a key-value table 806. The number of bits chosen for the index determines the size of the table. Note that the term "key-value table" (or "key-value database"), is here used as a term of art and does not indicate that key 809 is the index 808 for the table 806. The value 805 can contain the key 809, table data 804, and residue pointers. The key-value table can contain millions of values such as value 805. Each of the values can be stored at a location indicated by an index. As discussed below, hash collisions can occur because multiple keys can have the same index. Index locations in the table can therefore be referred to as hash buckets because multiple values having different keys but the same index can be accessed via the index location in the key-value table.

Table data 804 can be stored in the table 806 in association with the key. The table data 804 can be, for example, data that is input to a function (e.g., one or more arguments of a function), or can indicate a set of instructions that can be executed by the MPUs (e.g., a pointer to function). In some embodiments, the table data is a session Id that is passed as an input to executable code such as a function (set of instructions) that is run when a table lookup produces a value having the same key as the key 809. The table data can be or can include any one or more of: a session Id that is an index into a session table; input data for executable code; an indicator of the executable code to be executed by the MPUs; or other data. A session table can be a key-value table with the session Id being an index into the table (the key). A session table value, located in the session table via the session Id, can be or indicate executable code and data to be used to process a packet. As such, the session Id can indicate, via a session table, the executable code and data to be used to process a packet.

If a pipeline is configured for a network traffic flow, the key-value table has an entry for that flow. A table lookup uses the index 808 calculated from the key 809 and can return the value 805 at the indexed location in the key-value table 806. A collision occurs when the index calculated for two different flows are the same.

Figure 9:
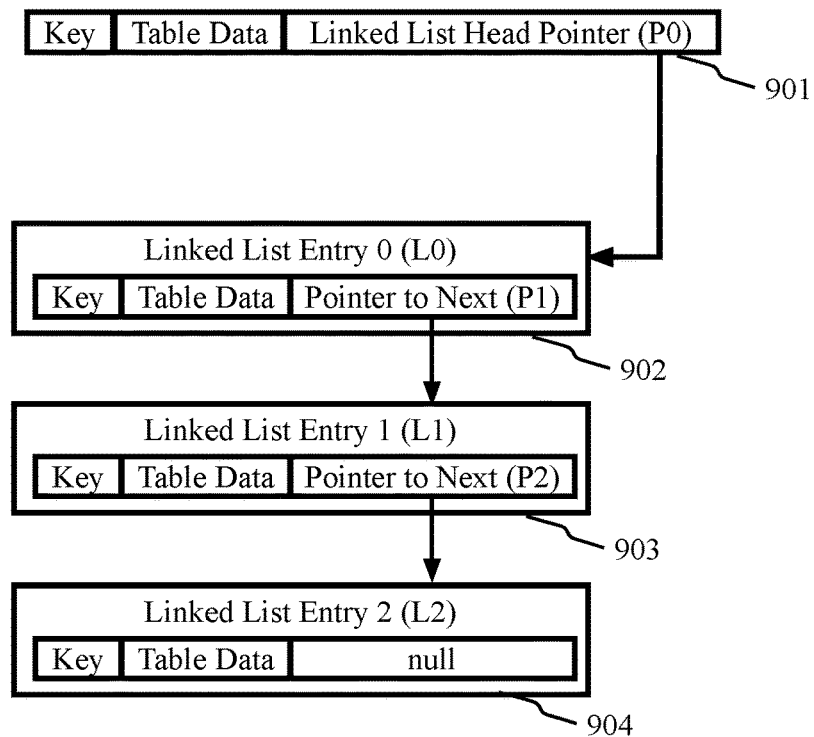
FIG. 9 illustrates collision handling via a linked list according to some aspects.

FIG. 9 illustrates collision handling via a linked list according to some aspects. A value 901 can be returned from a key-value table using an index calculated from a packet's key, which is the key 809 parsed and extracted from the packet. The packet's key can be compared to the key in the value 901. If the keys are the same, the table data in the value 901 can be used by the MPUs. If the keys are not the same, the table engine can follow the linked list head pointer P0 to the first linked list entry (L0) 902. If the packet's key is the same as the key in L0, the table data in L0 can be provided to the MPUs, otherwise the table engine can follow the pointer (P1) to the second linked list entry (L1) 903. If the packet's key is the same as the key in L1, the table data in L1 can be provided to the MPUs, otherwise the table engine can follow the pointer (P2) to the third linked list entry (L2) 904.

If the packet's key is the same as the key in L2, the table data in L2 can be provided to the MPUs, otherwise the table engine determines that a flow miss has occurred because L2 is the final entry in the linked list. As discussed above, the table data can be provided to executable code as input data. For example, the table data can be a session Id that is provided as input to the executable code. The table data can also be or include an indicator of the executable code to be run, in which case the table can include a function pointer, subroutine identifier, a branch address, or some other indicator of executable code. The match-action unit can report the flow miss. The pipeline may be configured to process the traffic flow of the PHV generating the flow miss by, in part, adding a fourth linked list entry based on the traffic flow. The insertion point for the fourth linked list entry can be the third linked list entry, the new entry to be added, as L3, after L2. Those familiar with computer programming and data structures are familiar with linked lists.

A possible race condition can occur when a first new flow and a second new flow have the same index, the match-action pipeline is not yet configured to process the first new flow, and the match-action pipeline is not yet configured to process the second new flow. In such a case, the match-action pipeline provides the same insertion point for both traffic flows. The race condition occurs if the same insertion point is used when configuring the match-action pipeline to process the first new flow and the second new flow. Flow entry state data can be used to avoid the race condition. The flow entry state data can indicate which insertion points are valid, which are invalid, or both. Before configuring the match-action pipeline for the first new traffic flow, the flow entry status data can be checked to find that the insertion point is a valid insertion point. The match-action pipeline can therefore be configured to process the first new flow and the flow entry status data can be updated because the insertion point is now invalid. Afterwards, and before configuring the match-action pipeline for the second new traffic flow, the flow entry status data can be checked to find that the insertion point is invalid. A valid insertion point for the second new flow can then be determined. For example, the CPU can access the flow table to determine a valid insertion point or can recirculate a packet of the second new flow, thereby causing a flow miss resulting in a new augmented PHV for the second new flow. The flow entry state data can be a table held in memory. For example, the table can indicate a valid insertion point for each index value.

Figure 10:
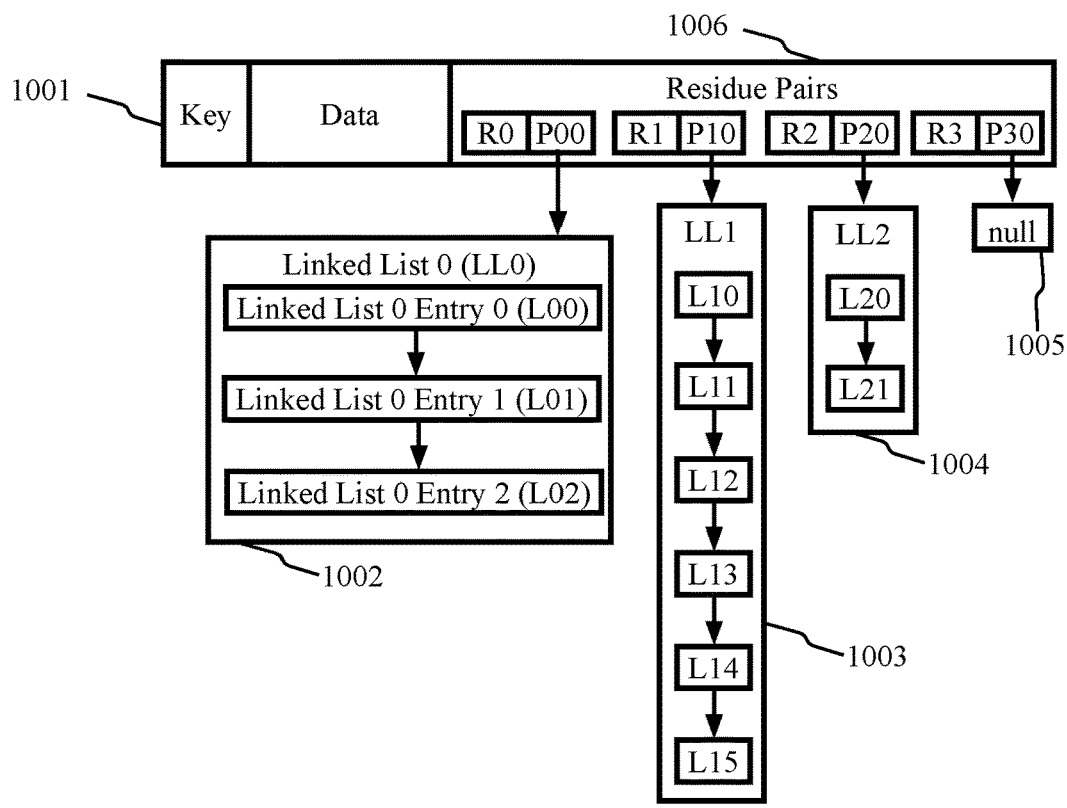
FIG. 10 illustrates collision handling via multiple linked lists according to some aspects.

FIG. 10 illustrates collision handling via multiple linked lists according to some aspects. Placing all the collisions for an index in the same linked list can result in a large data structure that is slow to traverse. Instead of one large linked list, multiple smaller linked lists can be used to more quickly find the table data or flow miss for a key. All or some of the bits of the residue can be used to indicate one of a number of linked lists. For example, two of the residue bits can be used to indicate one of four linked lists. The value 1001 returned from the key-value table can contain residue pairs 1006. The residue pairs each indicate a linked list. In the non-limiting example of FIG. 10, two bits of the residue are used to indicate one of four linked lists. The first residue pair [R0, P00] indicates that the first linked list (LL0) 1002 has a first entry (L00) located at P00. The second residue pair [R1, P10] indicates that the second linked list (LL1) 1003 has a first entry (L10) located at P10. The third residue pair [R2, P20] indicates that the third linked list (LL2) 1004 has a first entry (L20) located at P20. The fourth residue pair [R3, P30] indicates that the fourth linked list (LL3) is null 1005, it has no entries. A value can be stored in LL3 using the fourth residue pair as an entry point. The residue pairs can be a table with the residue bits indicating positions in the table. As an example, R0, R1, R2, and R3 can indicate locations 0, 1, 2, and 3 in a table of pointers. P00, P10, P20, and P30 can be stored in location 0, 1, 2, and 3, respectively.

Figure 11:
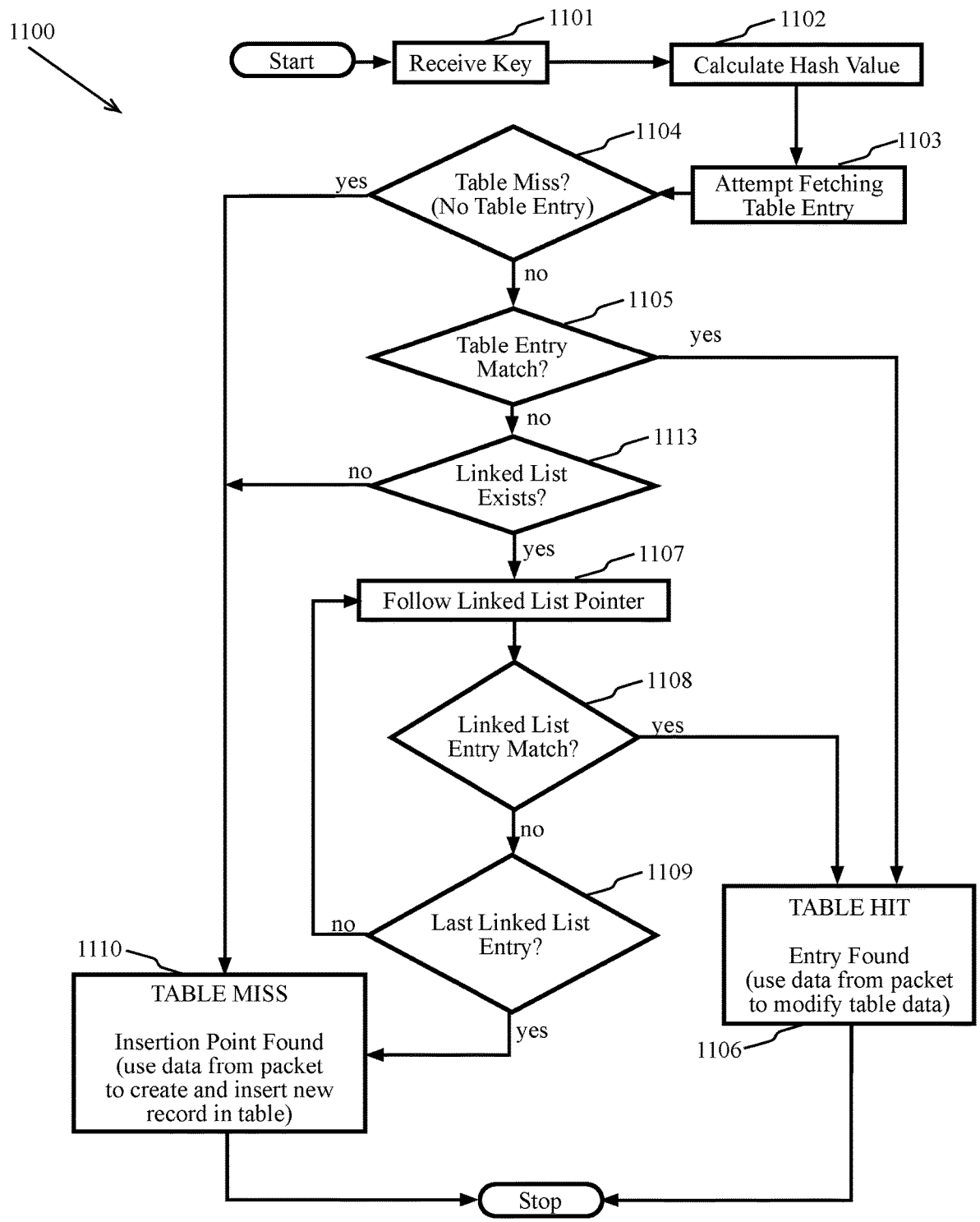
FIG. 11 is a high-level flow diagram 1100 of a process that can be implemented by a match-action unit to process a packet header vector according to some aspects.

FIG. 11 is a high-level flow diagram 1100 of a process that can be implemented by a match-action unit to process a packet header vector according to some aspects. A packet has been received by the parser of a P4 pipeline. The parser generates a PHV from the packet header. The table engine of a P4 match-action unit then attempts to locate a table entry for the PHV and to either provide table data to the MPUs or generate a flow miss. The entirety of the non-limiting exemplary process illustrated in FIG. 11 can be performed within a P4 pipeline.

At block 1101, a key, such as the packet 5-tuple in a PHV is received. At block 1102, a hash value is calculated from the key. The hash value can contain an index and a residue. The hash algorithm can be CRC-32. At block 1103, the process can attempt to fetch a table entry using the index to locate a value in the table. If the table stores a value at the index location, then the value is fetched. If no value is stored at the index location, a table miss occurs. If the table is a flow table, then the table miss indicates a flow miss wherein the flow table has no entry at all for a network flow. At block 1104, the process determines if a table miss has occurred. If a table miss has occurred, the process continues to block 1110. At block 1110, the processing associated with a table miss (e.g., default action 311) can be performed. In some instances, the key is associated with a value that is to be stored in the table. As such, the PHV can be augmented with key derivation metadata. The key derivation metadata can include the hash value and can indicate the insertion point. The key derivation metadata can also include a flag or other indicator of the flow miss. A new entry may be inserted at the insertion point. In some instances, the process is searching the table for a value matching the key and, as such, an indicator of a table hit may be returned that indicates that the table has an entry for the key or an indicator of a table miss may be returned that indicates that the table has no entry for the key.

If no table miss is detected at block 1104, then a returned value was obtained at block 1103 and the process continues to block 1105. At decision block 1105, the key received at block 1101 can be compared to the key in the returned value. If the returned value's key matches the key, then a table hit has occurred and the process continues to block 1106. At block 1106, a matching entry has been found and the processing associated with a table hit may be performed. In some instances, the key is associated with a value (e.g., values in the PHV) that is to be written into the table entry. In some instances, the process is searching the table for a value matching the key and, as such, the value may be returned because the table has an entry for the key. In some instances, such as when a network packet is being processed, the table data in the returned value may be sent to the MPUs which then process the network packet. The table data can include one or more values, such as a session Id, that can be input to executable code that is executed for each table hit. Alternatively, the table data can indicate a set of instructions that are to be executed. Yet another alternative is that the table data can indicate a set of instructions to be executed and can also contain input values for that set of instructions.

If the comparison at block 1105 indicates that the returned value's key does not match the key, then the process can continue to block 1113. At decision block 1113 the value can be checked for a valid pointer (e.g., a non-null pointer) to a linked list. If there is no valid pointer to a linked list at block 1113, then a table miss has occurred and the process continues to block 1110. Otherwise, a linked list exists and at block 1107 the pointer can be followed to the first linked list entry and a returned value can be obtained from the first linked list entry. At decision block 1108, the key received at block 1101 is compared to the key in the returned value obtained from the linked list. If the keys are the same, the process can proceed to block 1106. If the keys are not the same then the process can continue to decision block 1109. The linked list entries include a linked list pointer that, if valid, indicates the next entry in the linked list. If the linked list pointer is not valid (e.g., is a null pointer), then the current entry is the last entry in the linked list. At decision block 1109, the current linked list entry can be checked to determine if it is the last entry in the licked list. If the current entry is the last linked entry, then the process can continue to block 1110. If the current entry is not the last linked list entry, the process can loop back to block 1107 and follow the linked list pointer in the current linked list entry to the next linked list entry.

It is important to observe that in its normal course of operations, the match-action units can determine the key and hash value for every PHV they receive and can discover the insertion point for every flow miss. In some aspects, such as when processing a network packet, a flow miss can result in the PHV being placed in an input queue for the CPUs. As such, the CPUs can use the data in the PHV to configure the P4 pipeline for a network flow that includes the network packet that caused the flow miss.

The process illustrated in FIG. 11 can be implemented by a match unit such as match unit 317 of FIG. 3. As discussed above, a state sync packet (e.g., the state sync packet 530 illustrated in FIG. 5) can include state transition data (e.g., record 1 transition data 531 illustrated in FIG. 5). The state transition data can include a data structure identifier, a key identifying an entry in the data structure, and TLV fields. The TLV fields can include tags that identify fields in the data structure and can include field values for those fields. As such, the PHV for a state sync packet can include the data structure identifier, the key, and field values for fields in the entry identified by the key. The match unit may therefore search the data structure identified by the data structure identifier for an entry that has the key. A table hit occurs when the match unit finds an entry matching the key in the data structure. A table miss occurs when the match unit does not find an entry matching the key in the data structure.

When a table hit occurs for state transition data, the match unit has found an insertion point for matching entry in the data structure and the MPUs can copy the field values from the PHV into the entry in the data structure. The copy operation is within the capabilities of the MPUs because the MPUs can copy bits/bytes from a known memory location in the PHV to a known memory location in the database. The known memory location in the database can be a known offset from the insertion point because the data structure entries have a known format in memory.

When a table miss occurs for state transition data, the state sync packet, state transition data, and/or PHV can be sent to the control plane. The CPU cores may use the state transition data to create a new entry in the data structure. The new entry can have the key and values from the state transition data. In the future, state transition data matching the new entry can be processed by the packet processing pipeline. The CPU cores may be required for creating new entries because such operations can include memory management operations and other operations. For example, a new flow table entry for a new network flow may require locating/freeing memory for the new entry, creating a new session table entry for the new network flow, and configuring the packet processing pipeline to process network packets for the new network flow.

Figure 12:
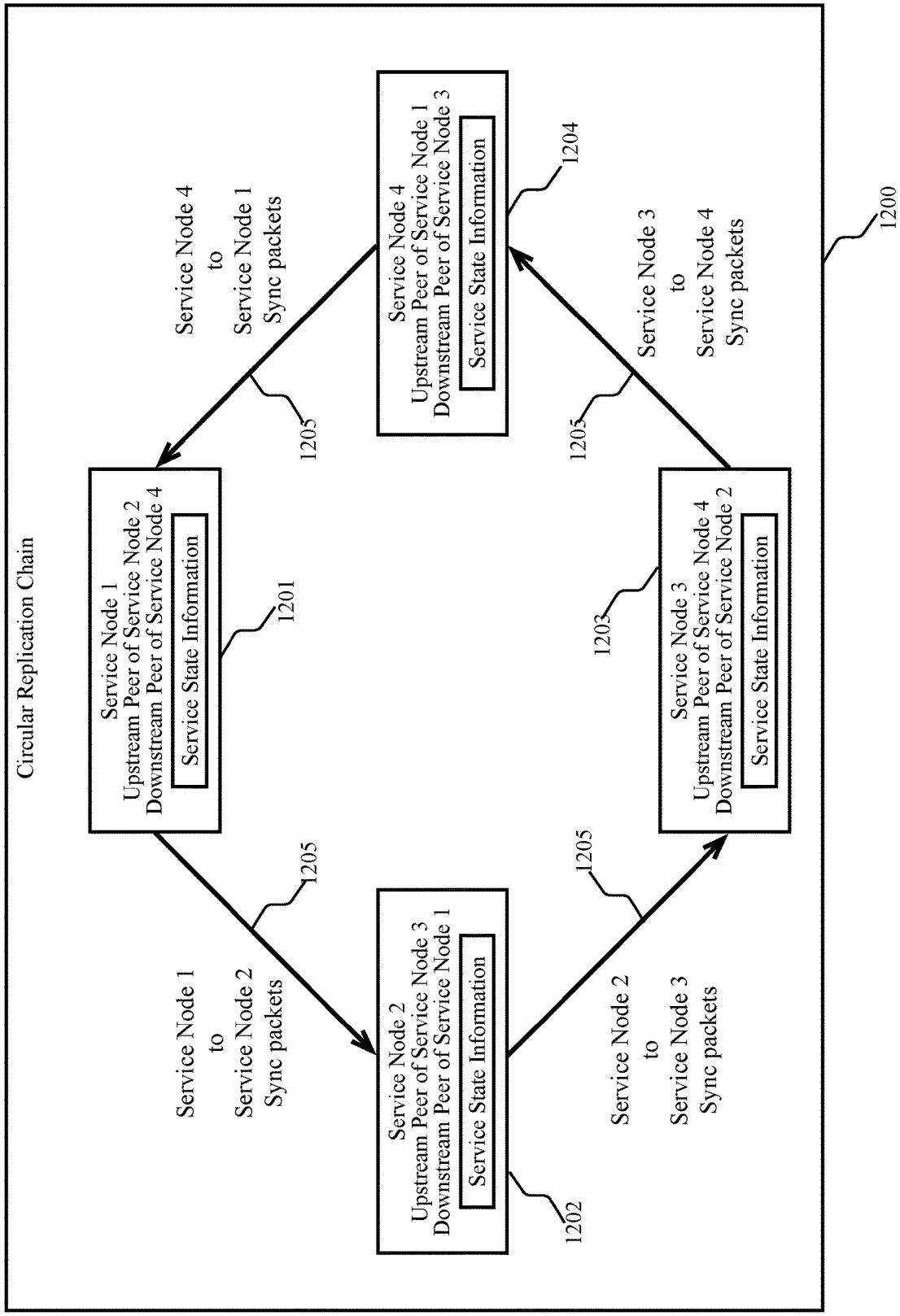
FIG. 12 is a high-level flow diagram illustrating network appliances configured as service nodes in a circular replication chain 1200 according to some aspects.

FIG. 12 is a high-level flow diagram illustrating network appliances configured as service nodes in a circular replication chain 1200 according to some aspects. Network services, such as routing, firewalling, load balancing, etc. can be provided by the service nodes. The service nodes can synchronize data structures, such as flow tables, session tables, etc. such that all the service nodes can provide network services to the same network flows as the other service nodes. Such synchronization allows for benefits such as high availability, and service scaling. A circular replication chain 1200 can be used to replicate databases (e.g., flow tables, session tables, etc.) storing service state information such that multiple service nodes have compatible versions of the service state information. As such, any of the service nodes in the circular replication chain can immediately process packets that do not change the service state information. In some cases, wherein processing a network packet changes the service state information, the change must be acknowledged before processing the packet can be completed. Many of the services provided by the service nodes can therefore scale linearly with the number of service nodes in the circular replication chain 1200. If a service node fails or is taken offline then that service node can be removed from the circular replication chain while the remaining service nodes continue providing services. In this manner, the service can be scaled by adding or removing service nodes and the service has high availability because it is resilient to service node failure.

The circular replication chain 1200 currently has four service nodes. The service nodes are service node 1 1201, service node 2 1202, service node 3 1203, and service node 4 1204. Sync packets can be used to replicate the service state information from one node to another node. The service nodes in a circular replication chain are peers. Each service node has an upstream peer and a downstream peer. The service nodes receive sync packets from their upstream peer and send sync packets to their downstream peer. Service node 1 1201 is the upstream peer of service node 2 1202 and sends sync packets 1205 to service node 2 1202. Service node 2 1202 is the downstream peer of service node 1 1201. Service node 2 1202 is the upstream peer of service node 3 1203 and sends sync packets 1205 to service node 3 1203. Service node 3 1203 is the downstream peer of service node 2 1202. Service node 3 1203 is the upstream peer of service node 4 1204 and sends sync packets 1205 to service node 4 1204. Service node 4 1204 is the downstream peer of service node 3 1203. Service node 4 1204 is the upstream peer of service node 1 1201 and sends sync packets 1205 to service node 1 1201. Service node 1 1201 is the downstream peer of service node 4 1204. For some services and functions, service state information replication results in the service nodes having exact copies of the information. In other cases, such as flow tables, replication or synchronization can result in service node information, such as pipeline configuration data, that is compatible but not exactly the same.

Some embodiments can use a replication chain that is not a circular replication chain. A non-circular replication chain has a head node, a tail node, and one or more intermediate nodes. Operations that change data, such as a write into a database or a service state change as considered herein, are submitted to the head node. Sync packets move from the head node to the tail node. The tail node has no downstream peer and therefore drops sync packets. The tail node can send an acknowledgement to the head node indicating that the sync packet has reached the tail of the chain. In order to use a non-circular replication chain, the head node is always the selected node for packets that change session state. Any node in the chain can process packets that do not change the session state information.

Figure 13:
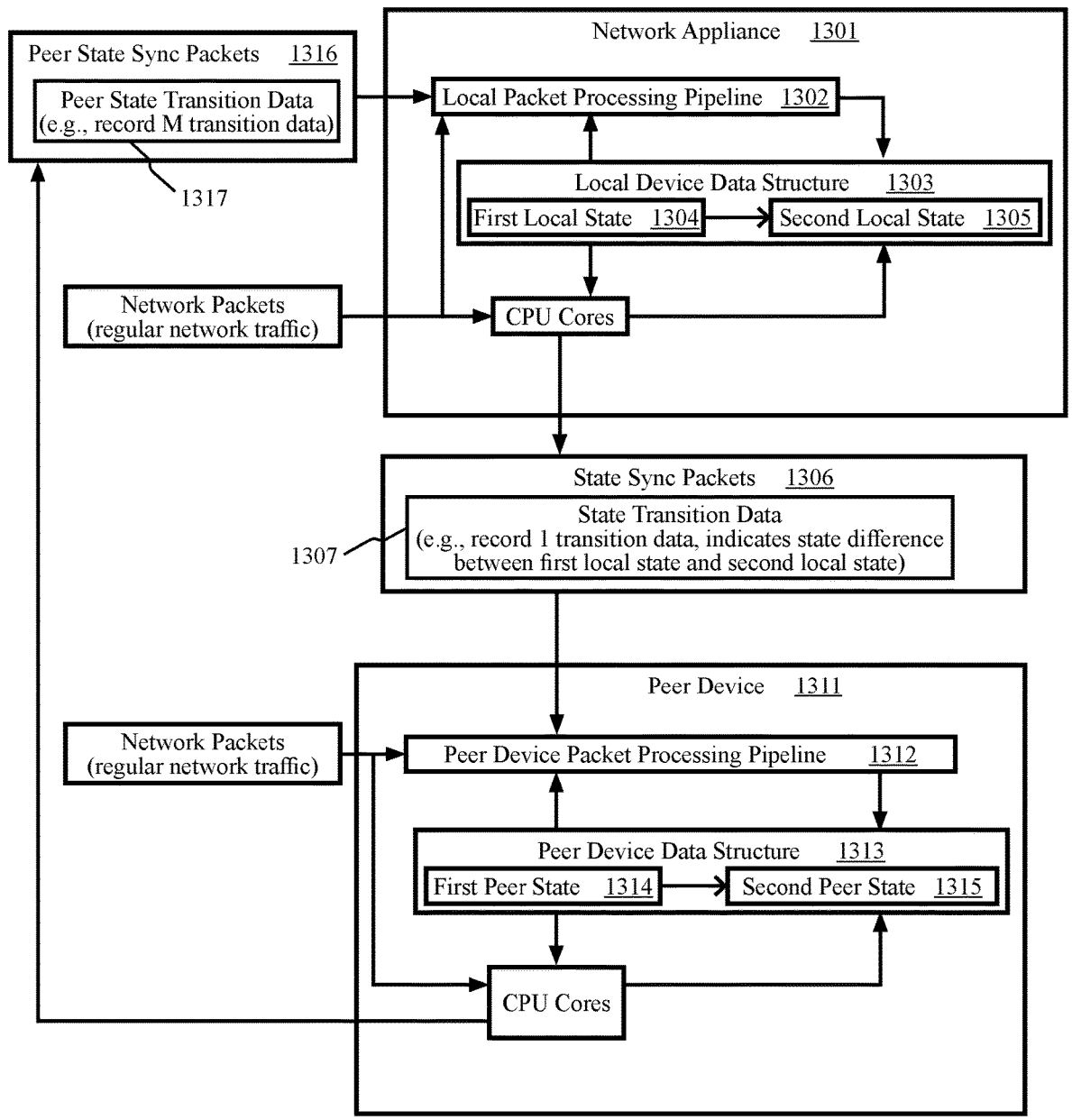
FIG. 13 illustrates a network appliance and a peer device processing network packets and exchanging state sync packets according to some aspects.

FIG. 13 illustrates a network appliance 1301 and a peer device 1311 processing network packets and exchanging state sync packets according to some aspects. The network appliance 1301 can receive and process network packets using the local packet processing pipeline 1302 and its CPU cores. In some cases, a network packet must be processed by the CPU cores and the CPU cores change a local data structure (e.g., flow table, session table, etc.) based on the processing of the network packet. For example, when a network packet in a network flow causes a flow miss (a table miss in the flow table) the network packet can be processed by the CPU cores and the CPU cores can create flow tables entries and session table entries for the network flow. The network appliance 1301 can track which records in the local data structure 1303 have changed by, for example, setting dirty flags associated with the records that have changed. The records can be flow table entries, session table entries, entries in other hash tables, entries in tree data structures, etc. The network appliance 1301 can create state sync packets 1306 that include state transition data 1307 for the records that have changed in the local data structure. The state transition data 1307 can be used by a peer device 1311 to update a peer device data structure 1313 from a first peer state 1314 to a second peer state 1315. The state transition data, such as record 1 transition data 531 shown if FIG. 5, can indicate a state difference between a first state (e.g., first local state or first peer state) and a second state (e.g., second local state or second peer state).

A peer device can be another network appliance that is substantially identical to the network appliance 1301. The peer device 1311 can receive and process network packets using the peer device packet processing pipeline 1312 and its CPU cores. In some cases, a network packet must be processed by the CPU cores and the CPU cores change a peer device data structure (e.g., flow table, session table, etc.) based on the processing of the network packet. The peer device 1311 can track which records in the peer device data structure 1313 have changed by, for example, setting dirty flags associated with the records that have changed. The records can be flow table entries, session table entries, hash table entries, entries in tree data structures, etc. The peer device 1311 can create state sync packets 1316 that include state transition data 1317 for the records that have changed in the peer device data structure. The state transition data 1317 can be used by the network appliance 1301 to update the local data structure 1303 from a first local state 1304 to a second local state 1305.

Figure 14:
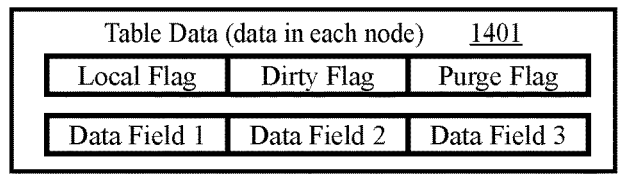
FIG. 14 illustrates a nonlimiting example of table data in accordance with certain aspects.

FIG. 14 illustrates a nonlimiting example of table data 1401 in accordance with certain aspects. The table data 1401 can be the data values in the nodes of data structures (e.g., records/entries in hash tables, trees, etc.). The table data can include a local flag, a dirty flag, a purge flag, and data fields such as data field 1, data field 2, and data field 3. The local flag indicates that the local device owns the record. Numerous devices can store synchronized copies of a database. For example, the replication chain 1200 illustrated in FIG. 12 has four nodes and each of those nodes can store a synchronized copy of a flow table. The node that creates a record for a new flow can be the owner of that record. The owner of a specific record may be the only node permitted to change that specific record. The dirty flag can be set when the owner of the record changes the record. The dirty flag can be cleared when state transition data for the associated record is included in a state sync packet, when the state sync packet is acknowledged, or when updating the record at peer nodes is acknowledged. The purge flag indicates that the record is to be deleted.

If a record's dirty flag is set, then the record is a dirty record. If a record's dirty flag is not set, then the record is not a dirty record and may be a clean record. If a record's local flag is set, then the record is a local record. If a record's local flag is not set, then the record is not a local record. A local dirty record is a record that is a dirty record and that is a local record. A local clean record is a record that is a local record and is not a dirty record.

Figure 15:
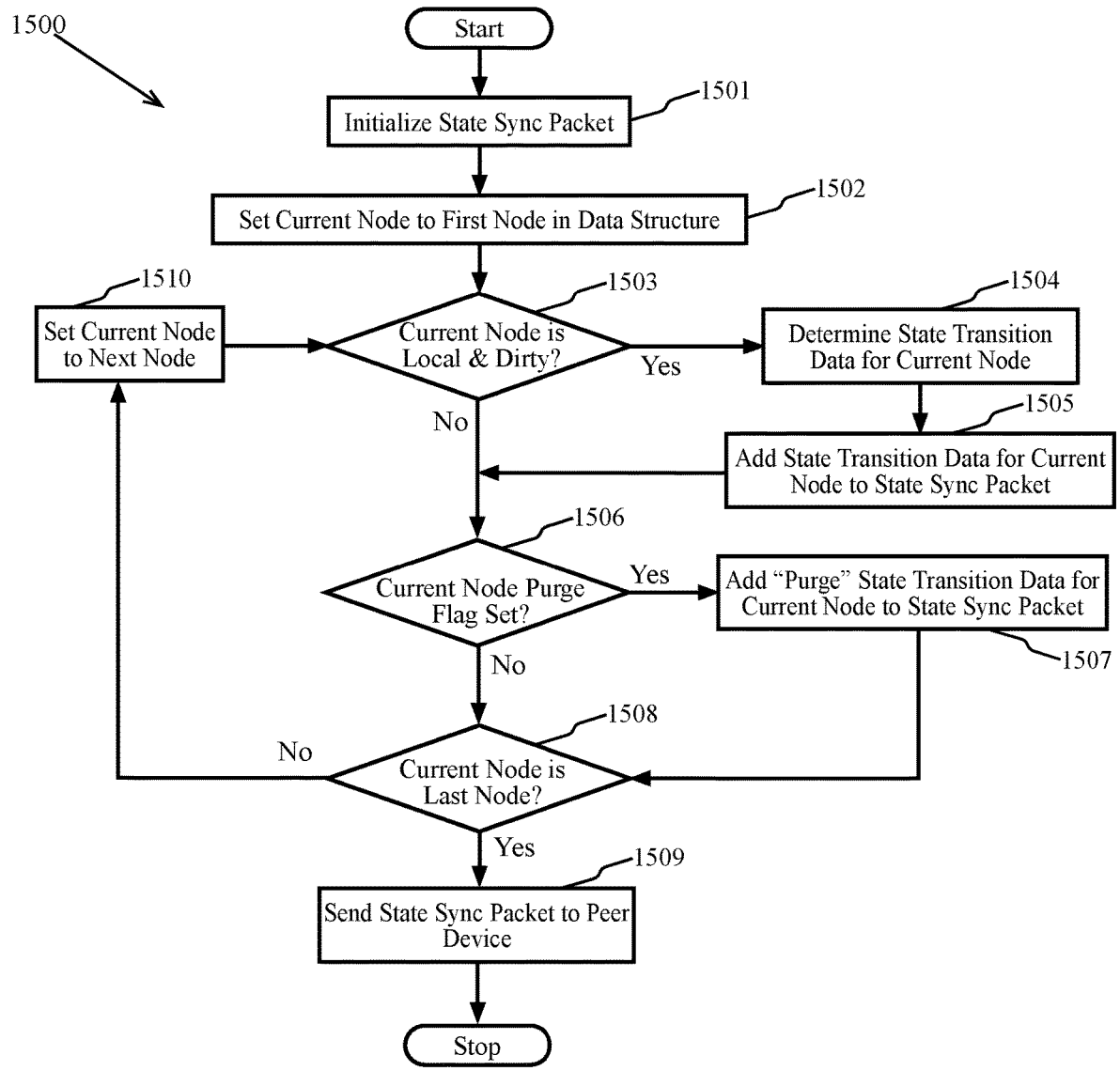
FIG. 15 is a high-level flow diagram illustrating a process producing a sync packet according to some aspects.

FIG. 15 is a high-level flow diagram illustrating a process producing a sync packet 1500 according to some aspects. In FIG. 15, the term node refers to an entry or record in a data structure. After the start, at block 1501 a sync packet can be initialized. At block 1502, the current node is set to a first node in the data structure. At decision block 1503, the process determines if the dirty flag and the local flag are both set for the current node. If the dirty flag and the local flag are set for the current node, then at block 1504 the state transition data is determined for the current node. For example, the state transition data can include the current values of all the current node's data fields. If the specific fields that have changed are known (e.g., via changed/dirty field indicators for the individual fields) then the state transition data may include only the current values of the fields that have changed in the current node. At block 1505, the state transition data for the current node can be added to the state sync packet before the process continues to decision block 1506. If at decision block 1503 the dirty flag and the local flag are not both set for the current node, then the process continues to decision block 1506. At decision block 1506, the process determines if the purge flag is set for the current node. If the purge flag is not set for the current node, then the process continues to decision block 1508. If the purge flag is set for the current node, then the process continues to block 1507 before proceeding to decision block 1508. At block 1507, state transition data is added to the state sync packet indicating the node is to be purged. If the purge flag is not set for the current node, then the process continues to decision block 1508. At decision block 1508, the process determines if the current node is the last node in the data structure. If the current node is the last node in the data structure, then at block 1510 the process sets the current node to the next node in the data structure as the process loops back to block 1503. If the current node is the last node in the data structure, then at block 1509 the state sync packet is sent to one or more peer devices before the process is done.

Figure 16:
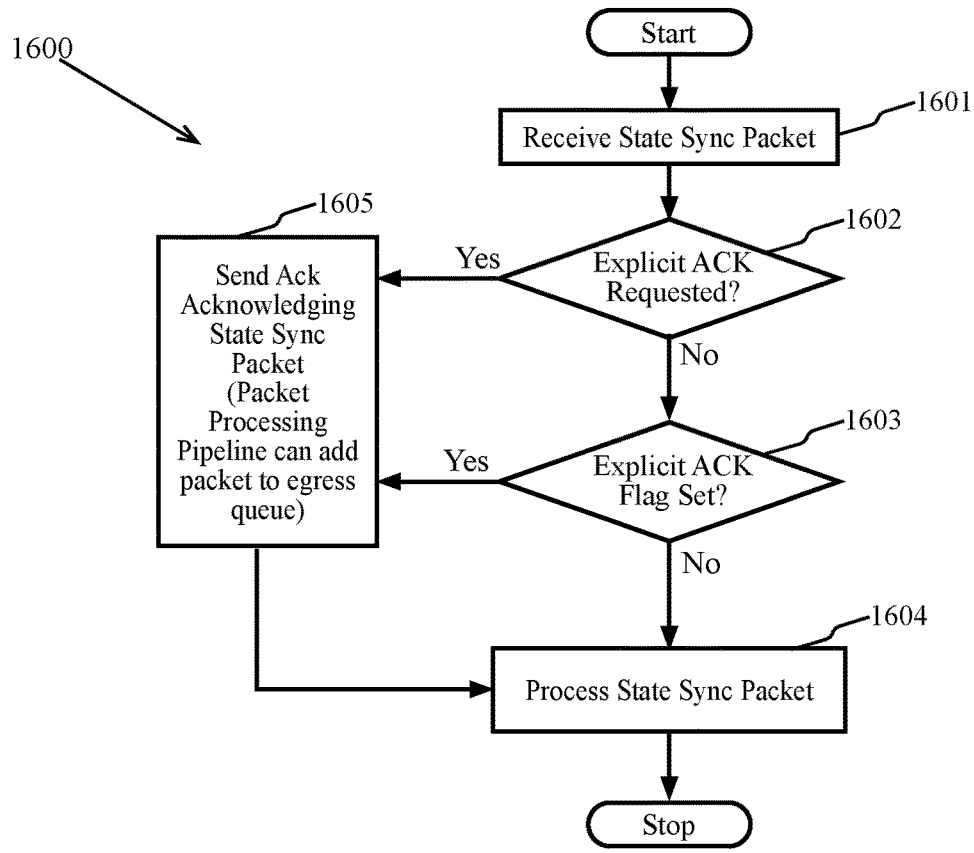
FIG. 16 is a high-level flow diagram illustrating a process processing a sync packet according to some aspects.

FIG. 16 is a high-level flow diagram illustrating a process processing a sync packet 1600 according to some aspects. After the start, at block 1601 a state sync packet is received. At decision block 1602, the process determines if an explicit ACK is requested. An explicit ACK is requested when the state sync packet includes a data field that indicates that the sender of the state sync packet requests that the recipient send an acknowledgement in response to receiving the state sync packet. If an explicit ACK is requested, the process continues to block 1605. If an explicit ACK is not requested, the process continues to decision block 1603. At decision block 1603, the process determines if an explicit ACK flag is set. The recipient of the state sync packet may have an explicit ACK flag for all state sync packets, for state sync packets from one or more peers, for specific data structures, etc. If the explicit ACK flag is set, the process continues to block 1605. If the explicit ACK flag is not set, the process continues to block 1604. At block 1605, an ACK is sent acknowledging receipt of the state sync packet. At block 1604, the state sync packet is processed before the process is done. The packet processing pipeline can send a state sync packet by adding the packet to an egress buffer or egress queue. The packet processing pipeline can be configured for sending the ACK because the ACK is a simple network packet that has a simple predefined format and the values for the header data fields and other data fields may be included in the PHV for the state sync packet.

Figure 17:
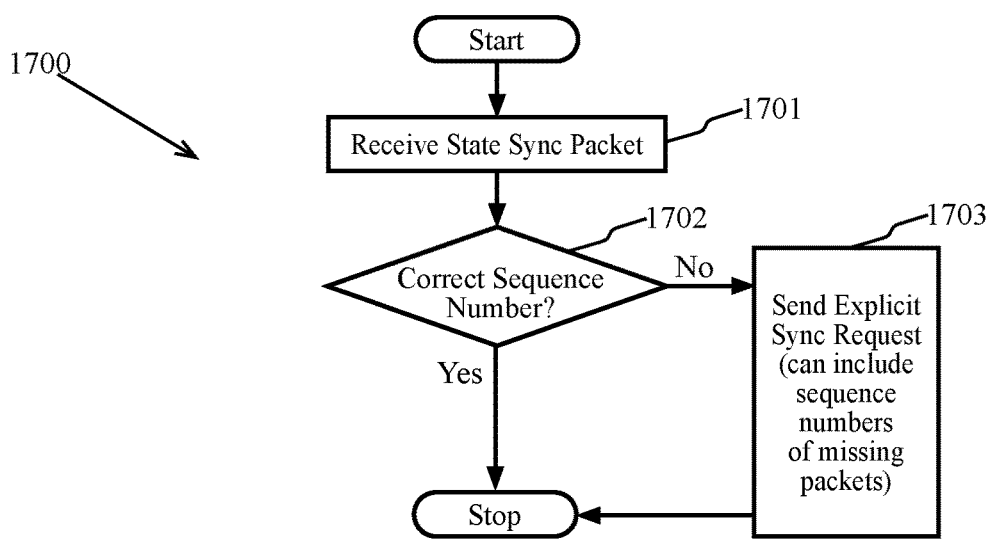
FIG. 17 is a high-level flow diagram illustrating a process sending an explicit sync request according to some aspects.

FIG. 17 is a high-level flow diagram illustrating a process sending an explicit sync request 1700 according to some aspects. An explicit sync request is a request for synchronization data (state transition data) that can be sent from one network appliance to another network appliance. After the start, at block 1701 a state sync packet is received from a sender. At decision block 1702, the process determines if the sequence number of the state sync packet is the correct sequence number. The state sync packets can include sequence numbers in ascending order or some other known order. As such, the recipient can determine what the next sequence number should be and can thereby detect if state sync packets have been lost or delivered out of sequence. If the process determines at decision block 1702 that the sequence number of the state sync packet is the correct sequence number, then the process is done. Otherwise, at block 1703 the process can send an explicit sync packet to the sender. The explicit sync request can include the sequence numbers of missing packets.

Figure 18:
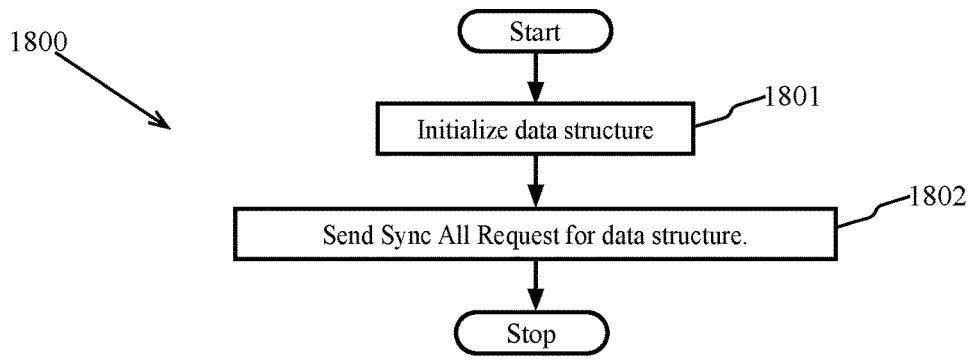
FIG. 18 is a high-level flow diagram illustrating a process sending a sync all request according to some aspects.

FIG. 18 is a high-level flow diagram illustrating a process sending a sync all request 1800 according to some aspects. A network appliance that is started, restarted, or reset may have no records in data structures such as flow tables, session tables, etc. In other cases, a network appliance may clear its local copy of a database and resync that database with its peers. The network appliance can send a sync all request in order to receive a complete copy of the data structure from its peer service nodes or other network devices. After the start, at block 1801 the data structure can be initialized such that it contains no records. At block 1802, the process can send a sync all request for that data structure.

Figure 19:
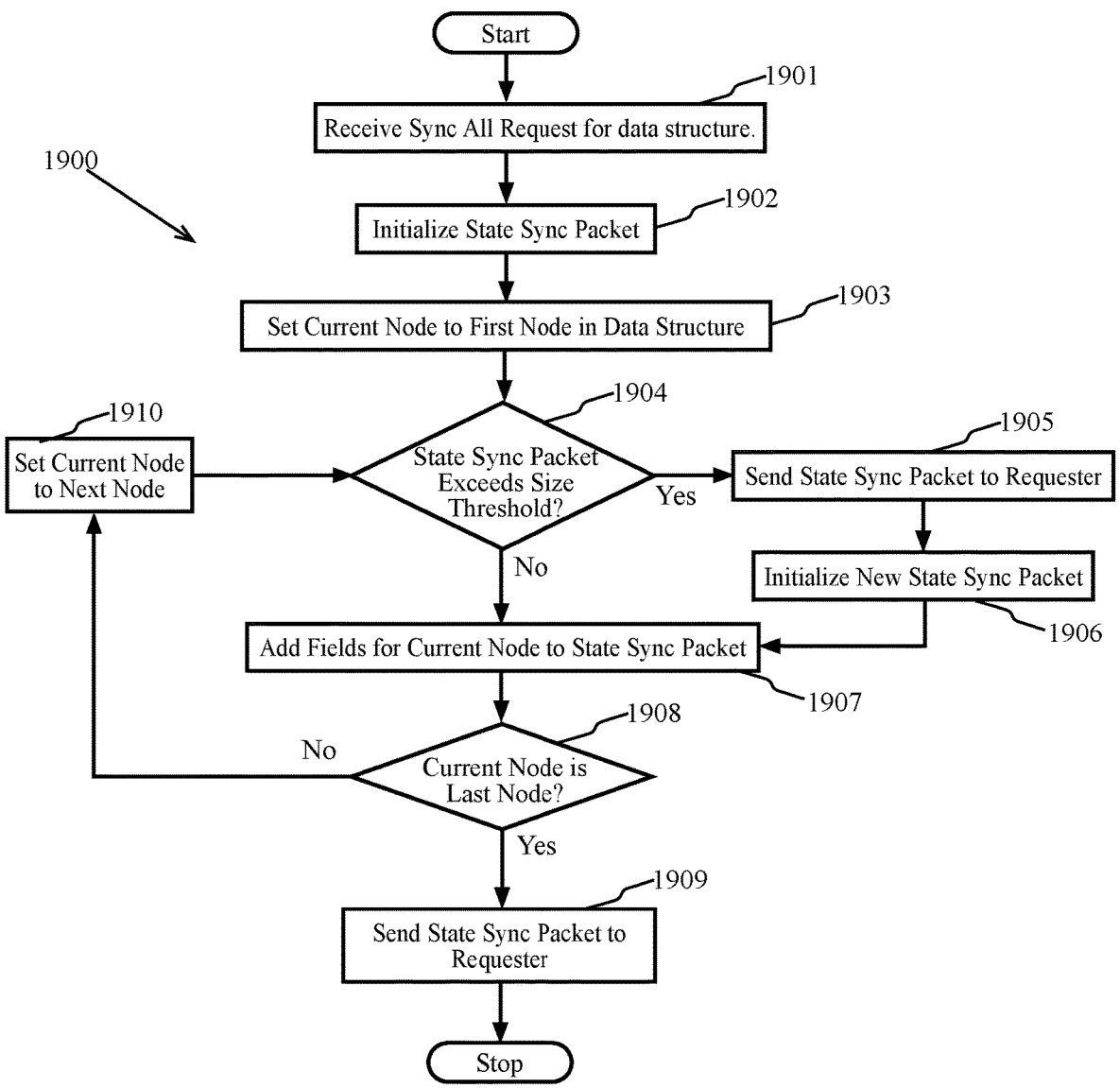
FIG. 19 is a high-level flow diagram illustrating a process responding to a sync all request according to some aspects.

FIG. 19 is a high-level flow diagram illustrating a process responding to a sync all request 1900 according to some aspects. After the start, at block 1901 a sync all request is received from a requester. At block 1902, a state sync packet is initialized. At block 1903, the current node is set to the first node of the data structure. At decision block 1904, the process determines if the state sync packet exceeds a size threshold. If the state sync packet does not exceed the size threshold, then the process continues to block 1907. If the state sync packet exceeds the size threshold, then at block 1905 the state sync packet is sent to the requester. At block 1906, a new state sync packet is initialized. At block 1907, the process adds fields from the current node to the state sync packet. For example, the fields can be added as state transition data that include current values for every field. At decision block 1908, the process determines if the current node is the last node. If the current node is the last node, then at block 1909 the state sync packet is sent to the requester before the process is done. If the current node is not the last node, then at block 1910 the current node is set to the next node of the data structure as the process loops back to decision block 1904. The process illustrated in FIG. 19 sends the entire data structure to the requester. An alternative process can send data for only those nodes that have the local flag set.

Figure 20:
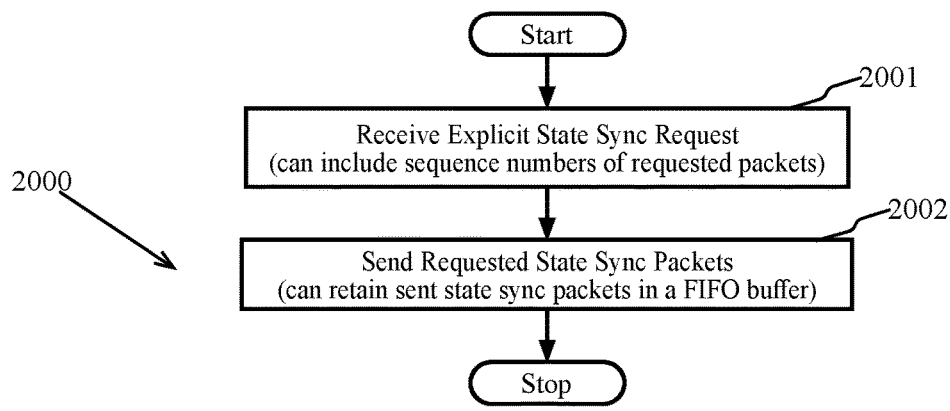
FIG. 20 is a high-level flow diagram illustrating a process responding to an explicit state sync request according to some aspects.

FIG. 20 is a high-level flow diagram illustrating a process responding to an explicit state sync request 2000 according to some aspects. After the start, at block 2001 an explicit state sync request is received from another device. The explicit state sync request can include sequence numbers of requested packets. At block 2002, the requested state sync packets are sent. State sync packets that have been sent to other devices can be stored in a first in first out (FIFO) queue such that requested state sync packets may be or are likely to be available for retransmission. Alternatively, state sync packets may be retained in memory until acknowledged. For example, an explicit ack received from another device can indicate that that other device has received the ACKed state sync packet and all previous state sync packets. As such, explicit ACKs can be requested such that the retained packets can be purged.

Figure 21:
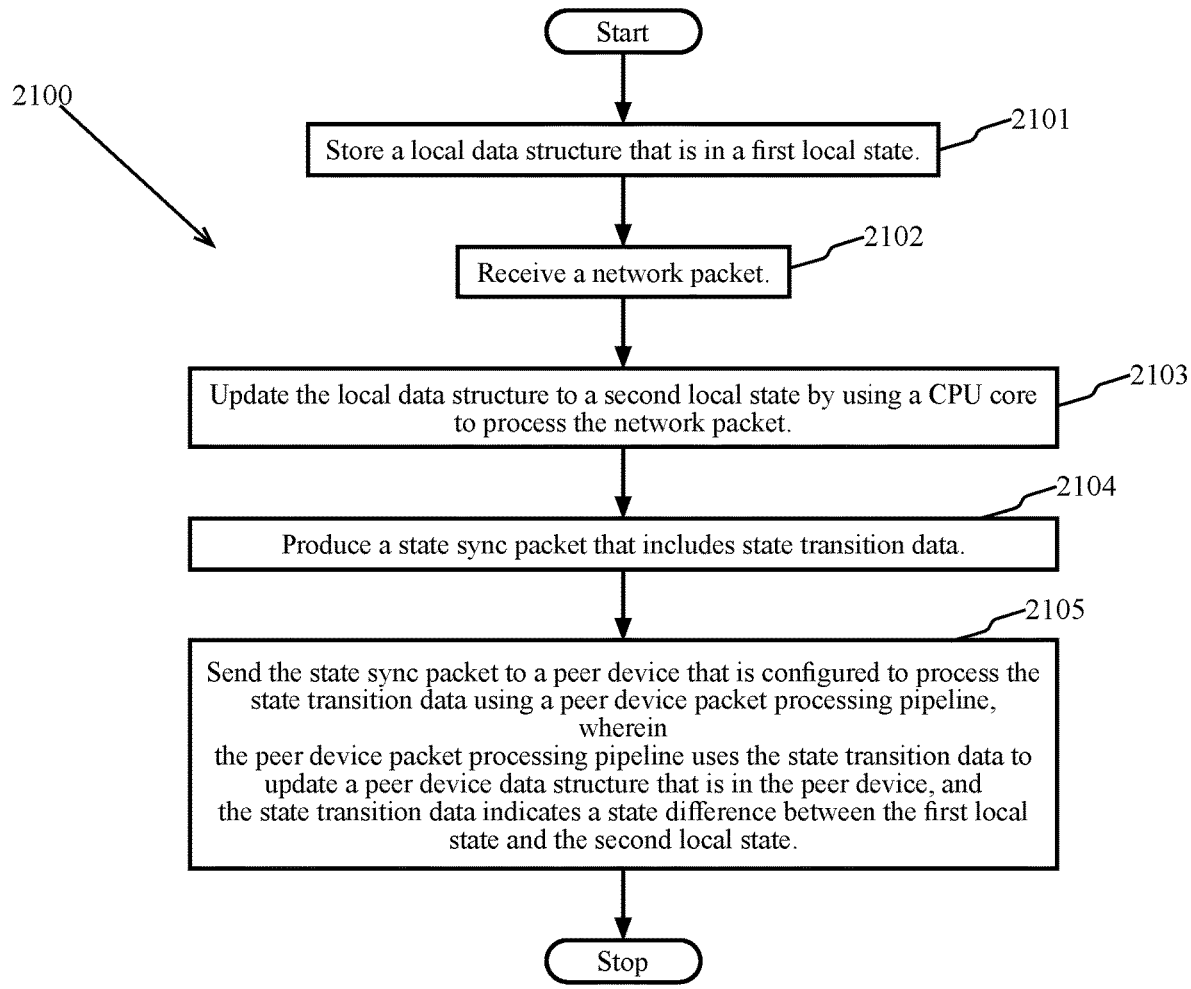
FIG. 21 is a high-level flow diagram illustrating a method for distributed high speed state synchronization according to some aspects.

FIG. 21 is a high-level flow diagram illustrating a method for distributed high speed state synchronization 2100 according to some aspects. After the start, at block 2101 the method can store a local data structure that is in a first local state. At block 2102, the method can receive a network packet. At block 2103, the method can update the local data structure to a second local state by using a CPU core to process the network packet. At block 2104, the method can produce a state sync packet that includes state transition data. At block 2105, the method can send the state sync packet to a peer device that is configured to process the state transition data using a peer device packet processing pipeline, wherein the peer device packet processing pipeline uses the state transition data to update a peer device data structure that is in the peer device, and the state transition data indicates a state difference between the first local state and the second local state.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
   storing a local data structure that is in a first local state;
   updating the local data structure to a second local state in response to receiving a network packet;
   sending, to a peer device, a state sync packet that includes state transition data that indicates a state difference between the first local state and the second local state;
   updating, by the peer device, a peer device data structure in response to the peer device receiving the state transition data in the state sync packet; and
   updating, by a local packet processing pipeline circuit, the local data structure to a third local state in response to processing peer state transition data received in a peer state sync packet.

2. The method of claim 1 wherein a plurality of state sync packets is used to synchronize the local data structure and the peer device data structure.

3. The method of claim 1 wherein the local packet processing pipeline circuit includes a parser stage and a plurality of match-action units.

4. The method of claim 1 wherein:
   the local packet processing pipeline circuit uses the peer state transition data to create a peer record in the local data structure; and
   updates to the peer record are restricted to peer updates from the peer device.

5. The method of claim 1 wherein:
   updating the local data structure to the second local state creates a new record that is marked local and dirty;
   the local data structure includes a plurality of local dirty records that includes the new record;
   a local packet processing pipeline is configured to use the local dirty records to produce the state sync packet; and
   the local packet processing pipeline is configured to mark the local dirty records as local clean records.

6. The method of claim 1 wherein the peer device is configured to:
   not acknowledge the state sync packet unless an explicit acknowledgement is requested; and
   send an explicit sync request after detecting a missing state sync packet.

7. The method of claim 1 further including:
   assembling a second state sync packet in response to receiving an explicit sync request from the peer device; and
   sending the second state sync packet to the peer device.

8. The method of claim 1 wherein a peer device packet processing pipeline circuit updates the peer device data structure.

9. The method of claim 1 wherein:
   updating the local data structure to the second local state creates a local record; and
   updates to the local record by the peer device are disallowed.

10. The method of claim 1 wherein the peer device is a downstream node in a replication chain.

11. The method of claim 1 further including:
sending a full state sync packet to the peer device in response to receiving a full state sync request, wherein the peer device is configured to use a peer device packet processing pipeline for full state population of the peer device data structure by processing the full state sync packet.

12. A network appliance comprising:
a memory configured to store a local data structure;
a CPU core configured to update the local data structure from a first local state to a second local state in response to processing a network packet received by the network appliance; and
a local packet processing pipeline circuit configured to update the local data structure to a third local state in response to processing peer state transition data that is in a peer state sync packet received from a peer device,
wherein the network appliance is further configured to send, to the peer device, a state sync packet that includes state transition data that indicates a state difference between the first local state and the second local state.

13. The network appliance of claim 12 wherein:
updating the local data structure by processing the peer state sync packet creates a peer record in the local data structure; and
updates to the peer record are restricted to peer updates from the peer device.

14. The network appliance of claim 12 wherein:
updating the local data structure to the second local state creates a new record that is marked local and dirty;
the local data structure includes a plurality of local dirty records that includes the new record;
the local packet processing pipeline circuit is configured to use the local dirty records to produce the state sync packet; and
the local packet processing pipeline circuit is configured to mark the local dirty records as local clean records.

15. The network appliance of claim 12, wherein the network appliance is configured to:
not acknowledge the peer state sync packet unless an explicit acknowledgement is requested; and
send an explicit sync request after detecting a missing peer state sync packet.

16. The network appliance of claim 12, wherein the network appliance is configured to:
assemble a second state sync packet in response to receiving an explicit sync request from the peer device; and
send the second state sync packet to the peer device.

17. The network appliance of claim 12 wherein:
updating the local data structure to the second local state creates a local record; and
updates to the local record by the peer device are disallowed.

18. The network appliance of claim 12 wherein the peer device is a downstream node of the network appliance in a replication chain.

19. A system comprising:
a memory configured to store a data structure that is configured to store a local dirty record, and a peer record; and
a CPU core configured to create the local dirty record in response to processing a network packet;
a packet processing pipeline circuit configured to:
create the peer record in response to processing a peer state sync packet;
update the peer record in response to processing a second peer state packet;
use the local dirty record to produce a state sync packet;
send the state sync packet; and
mark the local dirty record as a local clean record in response to receiving an acknowledgment of the state sync packet.

* * * * *